US011029843B2

(12) United States Patent
Forlines et al.

(10) Patent No.: US 11,029,843 B2
(45) Date of Patent: Jun. 8, 2021

(54) TOUCH SENSITIVE KEYBOARD

(71) Applicant: Tactual Labs Co., New York, NY (US)

(72) Inventors: Clifton Forlines, Cape Elizabeth, ME (US); David Holman, Toronto (CA); Stephen Dennis, Uxbridge (CA); Ricardo Jorge Jota Costa, Toronto (CA); Steven Leonard Sanders, New York, NY (US); David Clark Wilkinson, Austin, TX (US); Braon Moseley, Round Rock, TX (US); Bruno Rodrigues De Araujo, Toronto (CA)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/334,010

(22) PCT Filed: Sep. 15, 2017

(86) PCT No.: PCT/US2017/051918
§ 371 (c)(1),
(2) Date: Mar. 16, 2019

(87) PCT Pub. No.: WO2018/053357
PCT Pub. Date: Mar. 22, 2018

(65) Prior Publication Data
US 2019/0294258 A1 Sep. 26, 2019

Related U.S. Application Data

(60) Provisional application No. 62/395,835, filed on Sep. 16, 2016.

(51) Int. Cl.
*G06F 3/0488* (2013.01)
*G06F 3/01* (2006.01)
(Continued)

(52) U.S. Cl.
CPC .......... *G06F 3/04886* (2013.01); *G06F 3/011* (2013.01); *G06F 3/0202* (2013.01);
(Continued)

(58) Field of Classification Search
None
See application file for complete search history.

(56) References Cited

U.S. PATENT DOCUMENTS

2006/0132447 A1\* 6/2006 Conrad ................. G06F 3/0219
345/168
2012/0326961 A1\* 12/2012 Bromer .................. G06F 3/044
345/156
(Continued)

*Primary Examiner* — Nicholas J Lee
(74) *Attorney, Agent, or Firm* — Adam Landa

(57) ABSTRACT

A touch sensitive keyboard is disclosed. In one embodiment, a touch sensitive keyboard is provided that has a touchpad area separate from the keyboard keys. The keyboard is configured to disabled touchpad sensitivity when certain touch signals are received. In another embodiment, a touch sensitive keyboard is used as a controller. In a controller mode, keys on a touch sensitive keyboard are adapted to output a signal strength corresponding to a distance between the key and a finger operating as a control. In an embodiment, a touch sensitive keyboard includes a processor adapted to output a keystroke in response to one of the plurality of touch sensitive keys being pressed, and to output one or more touch points determined by interpolating signal strength for each of the plurality of touch sensitive keys on the keyboard.

21 Claims, 18 Drawing Sheets

(51) Int. Cl.
  *G06F 3/023* (2006.01)
  *G06F 3/02* (2006.01)
  *G06F 3/042* (2006.01)

(52) U.S. Cl.
  CPC ............ *G06F 3/023* (2013.01); *G06F 3/0234* (2013.01); *G06F 3/0235* (2013.01); *G06F 3/0238* (2013.01); *G06F 3/0426* (2013.01); *G06F 2203/04108* (2013.01)

(56) References Cited

U.S. PATENT DOCUMENTS

| | | | |
|---|---|---|---|
| 2015/0309589 A1* | 10/2015 | Chang | G06F 3/0213 345/168 |
| 2017/0097689 A1* | 4/2017 | Miller | G06F 3/0219 |
| 2017/0212619 A1* | 7/2017 | Sharma | G06F 3/044 |

* cited by examiner

TOUCH SENSITIVE KEYBOARD

This application is a non-provisional of, and claims priority to, U.S. Provisional Patent Application No. 62/395,835, filed on Sep. 16, 2016 and entitled TOUCH SENSITIVE DEVICE INTERACTIONS. This application relates the disclosures of U.S. patent application Ser. No. 15/224,226, entitled HOVER-SENSITIVE TOUCHPAD, filed Jul. 29, 2016, U.S. patent application Ser. No. 15/251,859, entitled TOUCH-SENSITIVE OBJECTS, filed Aug. 30, 2016 and U.S. patent application Ser. No. 15/678,401, entitled SYSTEMS AND METHODS FOR ULTRASONIC, MILLIMETER WAVE AND HYBRID SENSING, filed Aug. 25, 2017. This application also relates to user interfaces such as the fast multi-touch sensors and other interfaces disclosed in U.S. patent application Ser. No. 15/056,805, entitled ALTERABLE GROUND PLANE FOR TOUCH SURFACES, filed Feb. 29, 2016, and U.S. patent application Ser. No. 14/490,363 entitled SYSTEMS AND METHODS FOR PROVIDING RESPONSE TO USER INPUT USING INFORMATION ABOUT STATE CHANGES AND PREDICTING FUTURE USER INPUT, filed Sep. 18, 2014. This application further relates to various layouts for the conductors of a capacitive sensor such as disclosed in U.S. patent application Ser. No. 15/099,179 entitled CAPACITIVE SENSOR PATTERNS filed Apr. 14, 2016 and U.S. patent application Ser. No. 15/690,234 entitled CAPACITIVE SENSOR filed Aug. 29, 2017. The entire disclosures of those above-identified applications and/or patents are incorporated herein by this reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems relate in general to the field of user input, and in particular to keyboards and keyboard switches sensitive to touch, including, hover and pressure.

BACKGROUND OF THE INVENTION

Known methods generally have the drawback of relying on only contacts within the key to determine when a key has been depressed. The ability, as disclosed herein, to sense hover, contact and key depress information—and to have information available to understand a user's gestures and interactions—introduces myriad possibilities for interacting with touch devices.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

DETAILED DESCRIPTION

Figure 1A:
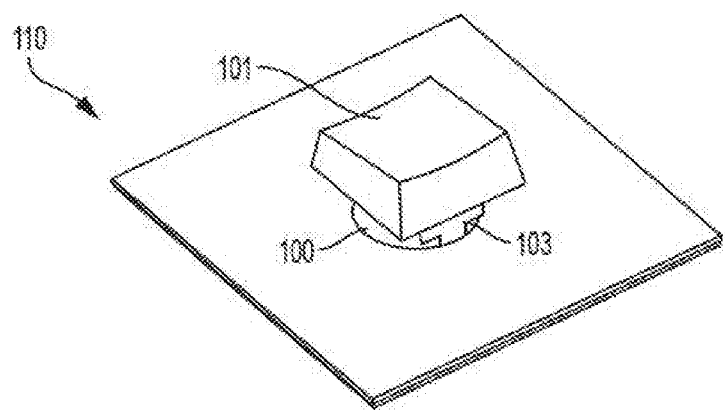
FIG. 1A shows a perspective view of an exemplary embodiment of a keyboard switch for use with a traditional-style keyboard.
Figure 1B:
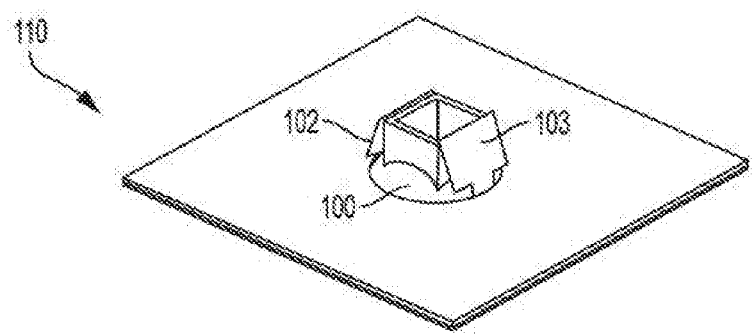
FIG. 1B shows a perspective view of the exemplary keyboard switch without a key cover.
Figure 1C:
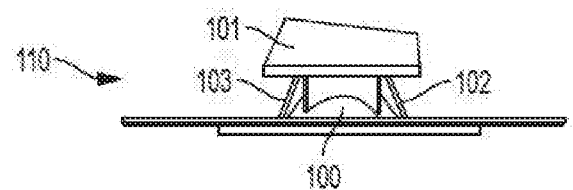
FIG. 1C shows a left side elevational view of the keyboard switch.
Figure 1D:
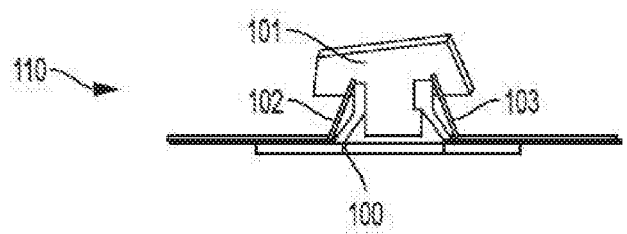
FIG. 1D shows a cross-sectional, right side view of the keyboard switch.

In various embodiments, the present disclosure is directed to keyboards sensitive to hover, contact and pressure and their applications in real-world, virtual reality, and augmented reality settings. It will be understood by one of ordinary skill in the art that the disclosures herein apply generally to all types of keyboards, including but not limited to membrane keyboards, dome-switch keyboards, scissor-switch keyboards, capacitive keyboards, mechanical-switch keyboards, buckling-spring keyboards, hall-effect keyboards, laser projection keyboard, roll-up keyboards, and optical keyboard technology.

Throughout this disclosure, the terms "hover", "touch", "touches," "contact," "contacts," "pressure," "pressures" or other descriptors may be used to describe events or periods of time in which a user's finger, a stylus, an object or a body part is detected by the sensor. In some embodiments, and as generally denoted by the word "contact", these detections occur when the user is in physical contact with a sensor, or a device in which it is embodied. In other embodiments, and as generally referred to by the term "hover", the sensor may be tuned to allow the detection of "touches" that are hovering at a distance above the touch surface or otherwise separated from the touch sensitive device. As used herein, "touch surface" includes a keyboard or key; however, as is readily understood, the touch surface may not have actual keys or features, and could be a generally feature-sparse surface. The use of language within this description that implies reliance upon sensed physical contact should not be taken to mean that the techniques described apply only to those embodiments; indeed, generally, what is described herein applies equally to "contact" and "hover", each of which being a "touch". More generally, as used herein, the term "touch" refers to an act that can be detected by the types of sensors disclosed herein, thus, as used herein the term "hover" is one type of "touch" in the sense that "touch" is intended herein. "Pressure" refers to the pressure of "contact", i.e., a force with which a user presses their fingers or hand against the key or other surface. The amount of "pressure" is similarly a measure of "touch". It should also be noted that a depressed key is a further type of "touch", thus, generally, as described herein, "touch" refers to the states of "hover", "contact" and a fully depressed key, whereas a lack of "touch" is generally identified by signals being below a threshold for accurate measurement by the sensor.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency—e.g., the first frequency being 10 Mhz and the second frequency being 10 Mhz; or could be different frequencies—e.g., the first frequency being 10 Mhz and the second frequency being 11 Mhz. Context may dictate otherwise, for example, where a first and a second frequency are further limited to being orthogonal to each other, in which case, they could not be the same frequency.

The presently disclosed systems provide for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. patent application Ser. No. 13/841,436, filed on Mar. 15, 2013 entitled "Low-Latency Touch Sensitive Device" and U.S. patent application Ser. No. 14/069,609 filed on Nov. 1, 2013 entitled "Fast Multi-Touch Post Processing." These applications contemplate capacitive FDM, CDM, or FDM/CDM hybrid touch sensors which may be used in connection with the presently disclosed sensors. In such sensors, touches may be sensed when the capacitive relationship between a driven conductor and a sensing conductor is changed (e.g., increased or decreased) and the result sensed on the sensing conductor.

This disclosure will first generally describe the operation of fast multi-touch sensors to which the present systems and methods for design, manufacturing and use can be applied. Details of systems and methods related to keyboards sensitive to hover, contact and pressure are then described further below under the heading "Keyboard Embodiments."

As used herein, the phrase "touch event" and the word "touch" when used as a noun include a near touch and a near touch event, or any other gesture that is identified using a sensor. In accordance with an embodiment, touch events may be detected, processed and supplied to downstream computational processes with very low latency, e.g., on the order of ten milliseconds or less, or on the order of less than one millisecond.

In an embodiment, the disclosed fast multi-touch sensor utilizes a projected capacitive method that has been enhanced for high update rate and low latency measurements of touch events. The technique can use parallel hardware and higher frequency waveforms to gain the above advantages. In an embodiment, disclosed methods and apparatus can be used to make sensitive and robust measurements, which methods may be used on transparent display surfaces and which may permit economical manufacturing of products which employ the technique. In an embodiment, disclosed methods and apparatus may be used on traditional keyboards, membrane keyboards and other keyboards having keys, as well as on feature-sparse or haptic keying surfaces, and on various keyboard switches (i.e., keys), and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to, e.g., the optical sensor, such embodiments utilize photon tunneling and leaking to sense a touch event, and a "capacitive object" as used herein includes any object, such as a stylus or finger, that that is compatible with such sensing. Similarly, "touch locations" and "touch sensitive device" as used herein do not require actual touching contact between a capacitive object and the disclosed sensor.

As described in U.S. patent application Ser. No. 14/216,948, entitled "Fast Multi-Touch Stylus and Sensor," filed on Mar. 17, 2014, fast multi-touch sensors transmit a different signal onto each of the unit's rows. The entire disclosure of this application is incorporated herein by reference. The signals are generally designed to be "orthogonal", i.e., separable and distinguishable from each other. A receiver is attached to each of the unit's arbitrarily designated column. The receiver is designed to receive any of the transmitted signals, or an arbitrary combination of them, with or without other signals and/or noise, and to individually determine a measure, e.g., a quantity for each of the orthogonal transmitted signals present on that column. The touch surface of the sensor comprises a series of rows and columns along which the orthogonal signals can propagate. In an embodiment, the rows and columns are designed so that, when they are not subject to a touch event, one amount of signal is coupled between them, whereas, when they are subject to a touch event, another amount of signal is coupled between them. In an embodiment, a lesser amount of signal may represent a touch event, and a greater amount of signal may represent a lack of touch. Because the touch sensor ultimately detects touch due to a change in the coupling, it is not of specific importance, except for reasons that may otherwise be apparent to a particular embodiment, whether the touch-related coupling causes an increase in amount of row signal present on the column or a decrease in the amount of row signal present on the column. As discussed above, the touch, or touch event does not require a physical touching, but rather an event that affects the level of coupled signal.

In an embodiment, generally, the capacitive result of a touch event in the proximity of both a row and column may cause a non-negligible change in the amount of signal present on the row being coupled to the column. More generally, touch events cause, and thus correspond to, the received signals on the columns. Because the signals on the rows are orthogonal, multiple row signals can be coupled to a column and distinguished by the receiver. Likewise, the signals on each row can be coupled to multiple columns. For each column coupled to a given row (and regardless of whether the coupling causes an increase or decrease in the row signal to be present on the column), the signals found on the column contain information that will indicate which rows are being touched in proximity to that column. The quantity of each signal received is generally related to the amount of coupling between the column and the row carrying the corresponding signal, and thus, may indicate a distance of the touching object to the surface, an area of the surface covered by the touch and/or the pressure of the touch.

When a row and column are touched simultaneously, some of the signal that is present on the row is coupled into the corresponding column (the coupling may cause an increase or decrease of the row signal on the column). (As discussed above, the term touch or touched does not require actual physical contact, but rather, relative proximity.) Indeed, in various implementations of a touch device, physical contact with the rows and/or columns is unlikely as there may be a protective barrier between the rows and/or columns and the finger or other object of touch. Moreover, generally, the rows and columns themselves are not in touch with each other, but rather, placed in a proximity that allows an amount of signal to be coupled there-between, and that amount changes (positively or negatively) with touch. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.

As is detailed in U.S. patent application Ser. No. 15/200,320, filed Jul. 1, 2016, entitled "Systems and Methods for Sensing Pressure in Touch Sensitive Devices," the entire disclosure of which is incorporated herein by reference, where there is actual physical contact, there is a relationship between the size and shape of the contact area between finger and touch surface and the amount of pressure applied to the surface. Because the human finger is not rigid, over a range, it deforms in accordance with pressure. As such, the contact area of a finger is generally larger when a high-level of pressure is applied to the touch surface and smaller when a lower-level of pressure is applied. Similarly, with respect to capacitive coupling between rows and columns in a capacitive touch sensor, generally, the greater the pressure applied, the higher the capacitive coupling. The amount of capacitive coupling can be inferred by the touch system's usual method of operation. In an embodiment, changes in the amount of capacitive coupling will change measured signal strength between rows and columns. A greater-level of pressure causes more skin, fat, muscle, and tissue to come in close contact with the touch surface, and these parts of the human body provide the conductance and dielectric which result in increased capacitive coupling.

The nature of the rows and columns is arbitrary and the particular orientation is irrelevant. Indeed, the terms row and column are not intended to refer to a square grid, but rather to a set of conductors upon which signal is transmitted (rows) and a set of conductors onto which signal may be coupled (columns). (The notion that signals are transmitted on rows and received on columns itself is arbitrary, and signals could as easily be transmitted on conductors arbitrarily named columns and received on conductors arbitrarily named rows, or both could arbitrarily be named something else.) Further, it is not necessary that the rows and columns be in a grid. Other shapes are possible as long as a touch event will touch part of a "row" and part of a "column", and cause some form of coupling. For example, the "rows" could be in concentric circles and the "columns" could be spokes radiating out from the center. As another example, as disclosed in U.S. patent application Ser. No. 15/690,234 the rows and columns need not cross at all. And neither the "rows" nor the "columns" need to follow any geometric or spatial pattern, thus, for example, the keys on a keyboard can be arbitrarily connected to form rows and columns (related or unrelated to their relative positions.) Moreover, it is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmission and sometimes supporting receipt. It is also contemplated that the signal propagation channels can simultaneously support transmitters and receivers—provided that the signals transmitted are orthogonal, and thus separable, from the signals received. Three or more types of antenna conductors may be used rather than just "rows" and "columns." Many alternative embodiments are possible and will be apparent to a person of skill in the art after considering this disclosure.

As noted above, in an embodiment the touch surface comprises of a series of rows and columns, along which signals can propagate. As discussed above, the rows and columns are designed so that, when they are not being touched, one amount of signal is coupled between them, and when they are being touched, another amount of signal is coupled between them. The change in signal coupled between them may be generally proportional or inversely proportional (although not necessarily linearly proportional) to the touch such that touch is less of a yes-no question, and more of a gradation, permitting distinction between more touch (i.e., closer or firmer) and less touch (i.e., farther or softer)—and even no touch. Moreover, a different signal is transmitted into each of the rows. In an embodiment, each of these different signals are orthogonal (i.e., separable and distinguishable) from one another. When a row and column are touched simultaneously, signal that is present on the row is coupled (positively or negatively), causing more or less to appear in the corresponding column. The quantity of the signal that is coupled onto a column may be related to the proximity, pressure or area of touch.

A receiver is attached to each column. The receiver is designed to receive the signals present on the columns, including any of the orthogonal signals, or an arbitrary combination of the orthogonal signals, and any noise or other signals present. Generally, the receiver is designed to receive a frame of signals present on the columns, and to identify the columns providing signal. In an embodiment, the receiver (or a signal processor associated with the receiver data) may determine a measure associated with the quantity of each of the orthogonal transmitted signals present on that column during the time the frame of signals was captured. In this manner, in addition to identifying the rows in touch with each column, the receiver can provide additional (e.g., qualitative) information concerning the touch. In general, touch events may correspond (or inversely correspond) to received signals on the columns. For each column, the different signals received thereon indicate which of the corresponding rows is being touched in proximity with that column. In an embodiment, the amount of coupling between the corresponding row and column may indicate e.g., the area of the surface covered by the touch, the pressure of the touch, etc. In an embodiment, a change in coupling over time between the corresponding row and column indicates a change in touch at the intersection of the two.

Simple Sinusoid Embodiment

In an embodiment, the orthogonal signals being transmitted onto the rows may be unmodulated sinusoids, each having a different frequency, the frequencies being chosen so that they can be distinguished from each other in the receiver. In an embodiment, frequencies are selected to provide sufficient spacing between them such that they can be more easily distinguished from each other in the receiver. In an embodiment, frequencies are selected such that no simple harmonic relationships exist between the selected frequencies. The lack of simple harmonic relationships may mitigate non-linear artifacts that can cause one signal to mimic another.

Generally, a "comb" of frequencies, where the spacing between adjacent frequencies is constant, will meet these criteria if the spacing between frequencies, $\Delta f$, is at least the reciprocal of the measurement period (aka integration period) $\tau$. In an embodiment, such a "comb" of frequencies may include the constraint that the highest frequency is less than twice the lowest. For example, if it is desired to measure a combination of signals (from a column, for example) to determine which row signals in one millisecond ($\tau$), then the frequency spacing ($\Delta f$) must be one kilohertz or more (i.e., $\Delta f >= 1/\tau$). For the avoidance of doubt, the measurement or integration period $\tau$ does not define when the measurements are taken, but rather defines the period during which the measurements are taken. In other words, a measurement of measurement period $\tau$ can be taken at a slower rate, and thus, a measurement of measurement period $\tau$ of 1 millisecond may, but need not be, taken every millisecond. For example, such a measurement could be taken every millisecond, or every 1.5 millisecond or every two milliseconds, or at any other spacing, without departing from the spirit and scope of the disclosure.

In an illustrative example, with ten rows, one could use the following frequencies:

| | |
|---|---|
| Row 1: | 5.000 MHz |
| Row 2: | 5.001 MHz |
| Row 3: | 5.002 MHz |
| Row 4: | 5.003 MHz |
| Row 5: | 5.004 MHz |
| Row 6: | 5.005 MHz |
| Row 7: | 5.006 MHz |
| Row 8: | 5.007 MHz |
| Row 9: | 5.008 MHz |
| Row 10: | 5.009 MHz |

It will be apparent to one of skill in the art that frequency spacing may be greater than this minimum $\Delta f = 1/\tau$. As an example, a 20 cm by 20 cm touch surface with 0.5 cm row/column spacing would require forty rows and forty columns and necessitate sinusoids at forty different frequencies. While a once per millisecond analysis rate would require only 1 KHz spacing, an arbitrarily larger spacing is utilized for a more robust implementation. In an embodiment, the arbitrarily larger spacing is subject to the constraint that the maximum frequency should not be more than twice the lowest (i.e., $f_{max} < 2(f_{min})$). Thus, in an exemplary embodiment, a frequency spacing of 100 kHz with the lowest frequency set at 5 MHz may be used, yielding a frequency list of 5.0 MHz, 5.1 MHz, 5.2 MHz, etc. up to 8.9 MHz.

In an embodiment, each of the sinusoids on the list may be generated by a signal generator and transmitted on a separate row by a signal emitter or transmitter. In an embodiment, the sinusoids may be pre-generated. To identify the rows and columns that are being simultaneously touched, a receiver receives any signals present on the columns and a signal processor analyzes the signal to determine which, if any, frequencies on the list appear. In an embodiment, the identification can be supported with a frequency analysis technique (e.g., Fourier transform), or by using a filter bank. In an embodiment, the receiver receives a frame of column signals, which frame is processed through an FFT, and thus, a measure is determined for each frequency. In an embodiment, the FFT provides an in-phase and quadrature measure for each frequency, for each frame.

In an embodiment, from each column's signal, the receiver/signal processor can determine a value (and in an embodiment an in-phase and quadrature value) for each frequency from the list of frequencies found in the signal on that column. In an embodiment, where the value corresponding to a frequency is greater or lower than some threshold, or changes from a prior value, that information is used to identify a touch event between the column and the row corresponding to that frequency. In an embodiment, signal strength information, which may correspond to various physical phenomena including the distance of the touch from the row/column intersection, the size of the touch object, the pressure with which the object is pressing down, the fraction of row/column intersection that is being touched, etc. may be used as an aid to localize the area of the touch event. In an embodiment, the determined values are not self-determinative of touch, but rather are further processed along with other values to determine touch events.

Once values for each of the orthogonal frequencies have been determined for at least two frequencies (corresponding to rows) or for at least two columns, a two-dimensional map can be created, with the value being used as, or proportional/ inversely proportional to, a value of the map at that row/ column intersection. In an embodiment, values are determined at multiple row/column intersections on a touch surface to produce a map for the touch surface or region. In an embodiment, values are determined for every row/column intersection on a touch surface, or in a region of a touch surface, to produce a map for the touch surface or region. In an embodiment, the signals' values are calculated for each frequency on each column. Once signal values are calculated a two-dimensional map may be created. In an embodiment, the signal value is the value of the map at that row/column intersection. In an embodiment, the signal value is processed to reduce noise before being used as the value of the map at that row/column intersection. In an embodiment, another value proportional, inversely proportional or otherwise related to the signal value (either after being processed to reduce noise) is employed as the value of the map at that row/column intersection. In an embodiment, due to physical differences in the touch surface at different frequencies, the signal values are normalized for a given touch or calibrated. Similarly, in an embodiment, due to physical differences across the touch surface or between the intersections, the signal values need to be normalized for a given touch or calibrated.

In an embodiment, touch events are identified using a map produced from the value information, and thus, take into account the value changes of neighboring row/column intersections. In an embodiment, the two-dimensional map data may be thresholded to better identify, determine or isolate touch events. In an embodiment, the two-dimensional map data may be used to infer information about the shape, orientation, etc. of the object touching the surface.

In an embodiment, such analysis and touch processing described herein may be performed on a touch sensor's discrete touch controller. In another embodiment, such analysis and touch processing may be performed on other computer system components such as but not limited to one or more ASIC, MCU, FPGA, CPU, GPU, SoC, DSP or dedicated circuit. The term "hardware processor" as used herein means any of the above devices or any other device (now known or hereinafter developed) which performs computational functions.

Returning to the discussion of the signals being transmitted on the rows, a sinusoid is not the only orthogonal signal that can be used in the configuration described above. Indeed, as discussed above, any set of signals that can be distinguished from each other will work. Nonetheless, sinusoids may have some advantageous properties that may permit simpler engineering and more cost-efficient manufacture of devices which use this technique. For example, sinusoids have a very narrow frequency profile (by definition), and need not extend down to low frequencies, near DC. Moreover, sinusoids can be relatively unaffected by 1/f noise, which noise could affect broader signals that extend to lower frequencies.

In an embodiment, sinusoids may be detected by a filter bank. In an embodiment, sinusoids may be detected by frequency analysis techniques (e.g., Fourier transform/fast Fourier transform). Frequency analysis techniques may be implemented in a relatively efficient manner and may tend to have good dynamic range characteristics, allowing them to detect and distinguish between a large number of simultaneous sinusoids. In broad signal processing terms, the receiver's decoding of multiple sinusoids may be thought of as a form of frequency-division multiplexing. In an embodiment, other modulation techniques such as time-division and code-division multiplexing can also be used. Time division multiplexing has good dynamic range characteristics, but typically requires that a finite time be expended transmitting into (or analyzing received signals from) the touch surface. Code division multiplexing has the same simultaneous nature as frequency-division multiplexing, but may encounter dynamic range problems and may not distinguish as easily between multiple simultaneous signals.

Modulated Sinusoid Embodiment

In an embodiment, a modulated sinusoid may be used in lieu of, in combination with and/or as an enhancement of, the sinusoid embodiment described above. The use of unmodulated sinusoids may cause radio-frequency interference to other devices near the touch surface, and thus, a device employing them might encounter problems passing regulatory testing (e.g., FCC, CE). In addition, the use of unmodulated sinusoids may be susceptible to interference from other sinusoids in the environment, whether from deliberate transmitters or from other interfering devices (perhaps even another identical touch surface). In an embodiment, such interference may cause false or degraded touch measurements in the described device.

In an embodiment, to avoid interference, the sinusoids may be modulated or "stirred" prior to being transmitted by the transmitter in a manner that the signals can be demodulated ("unstirred") once they reach the receiver. In an embodiment, an invertible transformation (or nearly invertible transformation) may be used to modulate the signals such that the transformation can be compensated for and the signals substantially restored once they reach the receiver. As will also be apparent to one of skill in the art, signals emitted or received using a modulation technique in a touch device as described herein will be less correlated with other things, and thus, act more like mere noise, rather than appearing to be similar to, and/or being subject to interference from, other signals present in the environment.

U.S. patent application Ser. No. 13/841,436, filed Mar. 15, 2013, entitled "Low-Latency Touch Sensitive Device," discloses embodiments directed to frequency modulation, direct sequence spread spectrum modulation, and low-cost implementation embodiments. The entire disclosure of the application is incorporated herein by reference.

Sinusoid Detection

In an embodiment, sinusoids may be detected in a receiver using a complete radio receiver with a Fourier Transform detection scheme. Such detection may require digitizing a high-speed RF waveform and performing digital signal processing thereupon. Separate digitization and signal processing may be implemented for every column of the surface; this permits the signal processor to discover which of the row signals are in touch with that column. In the above-noted example, having a touch surface with forty rows and forty columns, would require forty copies of this signal chain. Today, digitization and digital signal processing are relatively expensive operations, in terms of hardware, cost, and power. It would be useful to utilize a more cost-effective method of detecting sinusoids, especially one that could be easily replicated and requires very little power.

In an embodiment, sinusoids may be detected using a filter bank. A filter bank comprises an array of bandpass filters that can take an input signal and break it up into the frequency components associated with each filter. The Discrete Fourier Transform (DFT, of which the FFT is an efficient implementation) is a form of a filter bank with evenly-spaced bandpass filters that may be used for frequency analysis. DFTs may be implemented digitally, but the digitization step may be expensive. It is possible to implement a filter bank out of individual filters, such as passive LC (inductor and capacitor) or RC active filters. Inductors are difficult to implement well on VLSI processes, and discrete inductors are large and expensive, so it may not be cost effective to use inductors in the filter bank.

At lower frequencies (about 10 MHz and below), it is possible to build banks of RC active filters on VLSI. Such active filters may perform well, but may also take up a lot of die space and require more power than is desirable.

At higher frequencies, it is possible to build filter banks with surface acoustic wave (SAW) filter techniques. These allow nearly arbitrary FIR filter geometries. SAW filter techniques require piezoelectric materials which are more expensive than straight CMOS VLSI. Moreover, SAW filter techniques may not allow enough simultaneous taps to integrate sufficiently many filters into a single package, thereby raising the manufacturing cost.

In an embodiment, sinusoids may be detected using an analog filter bank implemented with switched capacitor techniques on standard CMOS VLSI processes that employs an FFT-like "butterfly" topology. The die area required for such an implementation is typically a function of the square of the number of channels, meaning that a 64-channel filter bank using the same technology would require only $\frac{1}{256}$th of the die area of the 1024-channel version. In an embodiment, the complete receive system for the low-latency touch sensor is implemented on a plurality of VLSI dies, including an appropriate set of filter banks and the appropriate amplifiers, switches, energy detectors, etc. In an embodiment, the complete receive system for the low-latency touch sensor is implemented on a single VLSI die, including an appropriate set of filter banks and the appropriate amplifiers, switches, energy detectors, etc. In an embodiment, the complete receive system for the low-latency touch sensor is implemented on a single VLSI die containing n instances of an n-channel filter bank, and leaving room for the appropriate amplifiers, switches, energy detectors, etc.

Sinusoid Generation

Generating the transmit signals (e.g., sinusoids) in a low-latency touch sensor is generally less complex than detection, principally because each row requires the generation of a single signal (or a small number of signals) while the column receivers have to detect and distinguish between many signals. In an embodiment, sinusoids can be generated with a series of phase-locked loops (PLLs), each of which multiply a common reference frequency by a different multiple.

In an embodiment, the low-latency touch sensor design does not require that the transmitted sinusoids are of very high quality, but rather, may accommodate transmitted sinusoids that have more phase noise, frequency variation (over time, temperature, etc.), harmonic distortion and other imperfections than may usually be allowable or desirable in radio circuits. In an embodiment, the large number of frequencies may be generated by digital means and then employ a relatively coarse digital-to-analog conversion process. As discussed above, in an embodiment, the generated row frequencies should have no simple harmonic relationships with each other, any non-linearities in the generation process should not cause one signal in the set to "alias" or mimic another.

In an embodiment, a frequency comb may be generated by having a train of narrow pulses filtered by a filter bank, each filter in the bank outputting the signals for transmission on a row. The frequency "comb" is produced by a filter bank that may be identical to a filter bank that can be used by the receiver. As an example, in an embodiment, a 10-nanosecond pulse repeated at a rate of 100 kHz is passed into the filter bank that is designed to separate a comb of frequency components starting at 5 MHz, and separated by 100 kHz. The pulse train as defined would have frequency components from 100 kHz through the tens of MHz, and thus, would have a signal for every row in the transmitter. Thus, if the pulse train were passed through an identical filter bank to the one described above to detect sinusoids in the received column signals, then the filter bank outputs will each contain a single sinusoid that can be transmitted onto a row.

Fast Multi-Touch Post Processing

After the signal strengths from each row in each column have been calculated using, for example, the procedures described above, post-processing is performed to convert the resulting 2-D "heat map," also referred to as a "matrix," into usable touch events. In an embodiment, such post processing includes at least some of the following four procedures: field flattening, touch point detection, interpolation and touch point matching between frames. The field flattening procedure subtracts an offset level to remove crosstalk between rows and columns, and compensates for differences in amplitude between particular row/column combinations due to attenuation. The touch point detection procedure computes the coarse touch points by finding local maxima in the flattened signal. The interpolation procedure computes the fine touch points by fitting data associated with the coarse touch points to a paraboloid. The frame matching procedure matches the calculated touch points to each other across frames. Below, each of the four procedures is described in turn. Also disclosed are examples of implementation, possible failure modes, and consequences, for each processing step. Because of the requirement for very low latency, the processing steps should be optimized and parallelized.

The field flattening procedure is first described. Systematic issues due to the design of the touch surface and sensor electronics may cause artifacts in each column's received signal strength. In an embodiment, these artifacts may be compensated-for as follows. First, because of cross-talk between the rows and columns, the received signal strength for each row/column combination will experience an offset level. To a good approximation, this offset level will be constant and can be subtracted (or added) off.

Second, the amplitude of the signal received at a column due to a calibrated touch at a given row and column intersection will depend on that particular row and column, mostly due to attenuation of the signals as they propagate along the row and column. The farther they travel, the more attenuation there will be, so columns farther from the transmitters and rows farther from the receivers will have lower signal strengths in the "heat map" than their counterparts. If the RF attenuation of the rows and columns is low, the signal strength differences may be negligible and little or no compensation will be necessary. If the attenuation is high, compensation may be necessary or may improve the sensitivity or quality of touch detection. Generally, the signal strengths measured at the receivers are expected to be linear with the amount of signal transmitted into the columns. Thus, in an embodiment, compensation will involve multiplying each location in the heat map by a calibration constant for that particular row/column combination. In an embodiment, measurements or estimates may be used to determine a heat map compensation table, which table can be similarly used to provide the compensation by multiplication. In an embodiment, a calibration operation is used to create a heat map compensation table. The term "heat map" as used herein does not require an actual map of heat, but rather the term can mean any array of at least two dimensions comprising data corresponding to locations.

In an embodiment, the entire field flattening procedure is as follows. With nothing touching the surface, first the signal strength for each row signal at each column receiver is measured. Because there are no touches, substantially the entire signal received is due to cross-talk. The value measured (e.g., the amount of each row's signal found on each column) is an offset level that needs to be subtracted from that position in the heat map. Then, with the constant offsets subtracted, a calibrated touch object is placed at row/column intersections and the signal strength of that row's signal at that column receiver is measured. In an embodiment, all row/column intersections are used for calibration. The signal processor may be configured to normalize the touch events to the value of one location on the touch surface. The location likely to have the strongest signals can be arbitrarily chosen (because it experiences the least attenuation), i.e., the row/column intersection closest to the transmitters and receivers. If the calibrated touch signal strength at this location is SN and the calibrated touch signal strength for each row and column is SR, C then, if each location in the heat map is multiplied by (SN/SR,C), all touch values will be normalized. In an embodiment, calibrated touches may cause the normalized signal strength for any row/column in the heat map to be equal to one.

The field flattening procedure parallelizes well. Once the offsets and normalization parameters are measured and stored—which should only need to be done once (or possibly again at a maintenance interval)—the corrections can be applied as soon as each signal strength is measured.

In an embodiment, calibrating each row/column intersection may be required at regular or selected maintenance intervals. In an embodiment, calibrating each row/column intersection may be required once per unit. In an embodiment, calibrating each row/column intersection may be required once per design. In an embodiment, and particularly where, e.g., RF attenuation of the rows and columns is low, calibrating each row/column intersection may not be required at all. Moreover, in an embodiment where the signal attenuation along the rows and columns is fairly predictable, it may be possible to calibrate an entire surface from only a few intersection measurements.

If a touch surface does experience a lot of attenuation, the field flattening procedure will, at least to some degree, normalize the measurements, but it may have some side effects. For example, the noise on each measurement will grow as its normalization constant gets larger. It will be apparent to one of skill in the art, that for lower signal strengths and higher attenuations, this may cause errors and instability in the touch point detection and interpolation processes. Accordingly, in an embodiment, sufficient signal strength is provided for the signal undergoing the largest attenuation (e.g., the farthest row/column intersection).

Touch point detection is now addressed, where one or more coarse touch points are identified. In an embodiment, after the heat map is generated and the field flattened, one or more coarse touch points can be identified. In an embodiment, identifying the one or more coarse touch points may be done by finding local maxima in the normalized (i.e., flattened) signal strengths. In an embodiment, a fast and parallelizable method for finding the one or more touch points compares each element of the normalized heat map to its neighbors and labels an element as a local maximum if it is strictly greater than all of them. In an embodiment, a point is identified as a local maximum if it is both strictly greater than all of its neighbors and above a given threshold.

It is within the scope of this disclosure to define the set of neighbors in various ways. In an embodiment, the nearest neighbors are defined by a Von Neumann neighborhood. In an embodiment, the nearest neighbors are defined by a Moore neighborhood. The Von Neumann neighborhood may consist of the four elements that are vertically and horizontally adjacent to the element in the center (i.e., the elements to the north, south, east and west of it). This is also called a "four-connected" neighborhood. More complex (i.e., larger) Von Neumann neighborhoods are also applicable and may be used. The Moore neighborhood consists of the eight elements that are vertically, horizontally and diagonally adjacent to the element in the center (i.e., the elements to the north, south, east, west, northeast, northwest, southeast and southwest of it). This is also called the "eight-connected" neighborhood.

The neighborhood chosen may depend on the interpolation scheme used to calculate the fine touch points. This is illustrated in further detail below.

In a given neighbor comparison, a special case may exist where an element's normalized signal strength is equal to one or more of its neighbors, strictly, or within a tolerance to allow for noise levels. In an embodiment, neither point in such pair is considered to be a touch point even if they have values above the threshold. In an embodiment, both points in such pair are considered to be touch points. In an embodiment, regions where two or more neighboring points have approximately the same value are treated as one touch event. In an embodiment, regions where two or more neighboring points have approximately the same value are treated as a different type of touch event (e.g., perhaps someone has their wrist in contact with the touch surface) from the regions where a single local maxima can be found.

Turning now to the interpolation procedure. Once the coarse touch points have been determined (i.e., identified), fine touch points can be computed using interpolation. In an embodiment, the capacitive contact of a distributed touch is fit to a model function having a maximum. In an embodiment, the model function is a second-order function in two or more dimensions. In an embodiment, the second-order function is a paraboloid. In an embodiment, the paraboloid model is an acceptable approximation for a variety of objects that may be used to touch a touch surface, such as a finger or stylus. Moreover, as discussed below, the paraboloid model is relatively non-intensive computationally. In an embodiment, a more complex or more computationally intensive model may be used to provide more accurate estimation of the touch from the flattened heat map. For the purposes of the discussion below, the paraboloid is used as an illustrative example, but as will be apparent to one of skill in the art in view of this disclosure, that other models, including models of greater or lesser complexity may be employed for the purpose of interpolation.

For such a four-connected, Von Neumann neighborhood around an exemplary local maximum, the relevant points would appear with the central element being the local maximum and the subscripts being the coordinates of a particular element relative to it. The positions and signal strengths of the five elements fit into the following equation defining a paraboloid:

Where x and y are the position of an element, z is the signal strength of the element, and A, C, D, E and F are the coefficients of the second-order polynomial. Relative to the central point, all of element x, y positions are constant. The z values are the measured signal strengths at each element, and thus are known. In an embodiment, five simultaneous equations can be used to solve for the five unknown polynomial coefficients. Each equation represents one of the five points, including the central point and its four neighbors.

In an embodiment, a Vandermonde-like matrix can be employed to solve for the polynomial coefficients, as follows:

$$\begin{bmatrix} x_{0,1}^2 & y_{0,1}^2 & x_{0,1} & y_{0,1} & 1 \\ x_{-1,0}^2 & y_{-1,0}^2 & x_{-1,0} & y_{-1,0} & 1 \\ x_{0,0}^2 & y_{0,0}^2 & x_{0,0} & y_{0,0} & 1 \\ x_{1,0}^2 & y_{1,0}^2 & x_{1,0} & y_{1,0} & 1 \\ x_{0,-1}^2 & y_{0,-1}^2 & x_{0,-1} & y_{0,-1} & 1 \end{bmatrix} \begin{bmatrix} A \\ C \\ D \\ E \\ F \end{bmatrix} = \begin{bmatrix} z_{0,1} \\ z_{-1,0} \\ z_{0,0} \\ z_{1,0} \\ z_{0,-1} \end{bmatrix}$$

Substituting in the values for the element positions, provides:

$$\begin{bmatrix} 0 & 1 & 0 & 1 & 1 \\ 1 & 0 & -1 & 0 & 1 \\ 0 & 0 & 0 & 0 & 1 \\ 1 & 0 & 1 & 0 & 1 \\ 0 & 1 & 0 & -1 & 1 \end{bmatrix} \begin{bmatrix} A \\ C \\ D \\ E \\ F \end{bmatrix} = \begin{bmatrix} z_{0,1} \\ z_{-1,0} \\ z_{0,0} \\ z_{1,0} \\ z_{0,-1} \end{bmatrix}$$

And then solve for the polynomial coefficients by inverting the constant Vandermonde-like matrix:

$$\begin{bmatrix} 0 & 1 & 0 & 1 & 1 \\ 1 & 0 & -1 & 0 & 1 \\ 0 & 0 & 0 & 0 & 1 \\ 1 & 0 & 1 & 0 & 1 \\ 0 & 1 & 0 & -1 & 1 \end{bmatrix}^{-1} = \frac{1}{2}\begin{bmatrix} 0 & 1 & -2 & 1 & 0 \\ 1 & 0 & -2 & 0 & 1 \\ 0 & -1 & 0 & 1 & 0 \\ 1 & 0 & 0 & 0 & -1 \\ 0 & 0 & 2 & 0 & 0 \end{bmatrix}$$

This yields:

$$\begin{bmatrix} A \\ C \\ D \\ E \\ F \end{bmatrix} = \frac{1}{2}\begin{bmatrix} 0 & 1 & -2 & 1 & 0 \\ 1 & 0 & -2 & 0 & 1 \\ 0 & -1 & 0 & 1 & 0 \\ 1 & 0 & 0 & 0 & -1 \\ 0 & 0 & 2 & 0 & 0 \end{bmatrix} \begin{bmatrix} z_{0,1} \\ z_{-1,0} \\ z_{0,0} \\ z_{1,0} \\ z_{0,-1} \end{bmatrix}$$

In an embodiment, the polynomial coefficients are a linear combination of the signal strengths and only simple multiplication, involving negation and a single shift, are required to calculate them; accordingly, they can be efficiently computed in an FPGA or ASIC.

At the maximum of the paraboloid, both partial derivatives are zero:

$$\frac{\partial x}{\partial z} = 2Ax + D = 0 \text{ and}$$

$$\frac{\partial y}{\partial z} = 2Cy + E = 0$$

This will occur at the point $x_f$, $y_f$ where:

$$x_f = -\frac{D}{2A} \text{ and}$$

$$y_f = -\frac{E}{2C}$$

Thus, in an embodiment where the neighborhood data is fit to a paraboloid, and because a paraboloid has one maximum, that maximum is used as a location of the fine touch point. In an embodiment utilizing the four-connected neighborhood, the values $x_f$ and $y_f$ are independent of each other, with $x_f$ depending only on the signal strengths of the elements to the left and right of the center point, and $y_f$ depending only on the signal strengths of the elements above and below it.

For a Moore or eight-connected neighborhood around a local maximum, the relevant points would appear with the central element being the local maximum and the subscripts being the coordinates of a particular element relative to it. The positions and signal strengths of the nine elements can be fit to a paraboloid equation. Because more input data is available in this example than the previous example, a somewhat more complex equation for a parabolid can be employed:

$$Ax^2 + Bxy + Cy^2 + Dx + Ey + F = z$$

This equation has an added cross term and a new coefficient that permits the model to compensate for elongation in a direction other than x or y. Again, relative to the central point, all of the element, positions are constant and the values are known. Nine simultaneous equations (one per element) can be used to determine (i.e., overdetermine) the six unknown polynomial coefficients. A least-squares technique may be used to solve for the six unknown polynomial coefficients.

A Vandermonde-like matrix may be used to fit the polynomial. Unlike the embodiment described above, the matrix is non-square, with nine rows and six columns.

$$\begin{bmatrix} x_{-1,1}^2 & xy_{-1,1} & y_{-1,1}^2 & x_{-1,1} & y_{-1,1} & 1 \\ x_{0,1}^2 & xy_{0,1} & y_{0,1}^2 & x_{0,1} & y_{0,1} & 1 \\ x_{1,1}^2 & xy_{1,1} & y_{1,1}^2 & x_{1,1} & y_{1,1} & 1 \\ x_{-1,0}^2 & xy_{-1,0} & y_{-1,0}^2 & x_{-1,0} & y_{-1,0} & 1 \\ x_{0,0}^2 & xy_{0,0} & y_{0,0}^2 & x_{0,0} & y_{0,0} & 1 \\ x_{1,0}^2 & xy_{1,0} & y_{1,0}^2 & x_{1,0} & y_{1,0} & 1 \\ x_{-1,-1}^2 & xy_{-1,-1} & y_{-1,-1}^2 & x_{-1,-1} & y_{-1,-1} & 1 \\ x_{0,-1}^2 & xy_{0,-1} & y_{0,-1}^2 & x_{0,-1} & y_{0,-1} & 1 \\ x_{1,-1}^2 & xy_{1,-1} & y_{1,-1}^2 & x_{1,-1} & y_{1,-1} & 1 \end{bmatrix} \begin{bmatrix} A \\ B \\ C \\ D \\ E \\ F \end{bmatrix} = \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

All of the entries in the Vandermonde-like matrix are constant, and the z values are known, thus substituting in the constant values, yields $$\begin{bmatrix} 1 & 1 & 1 & -1 & -1 & 1 \\ 0 & 0 & 1 & 0 & -1 & 1 \\ 1 & -1 & 1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & -1 & 1 & -1 & 1 & 1 \\ 0 & 0 & 1 & 0 & 1 & 1 \\ 1 & 1 & 1 & 1 & 1 & 1 \end{bmatrix} \begin{bmatrix} A \\ B \\ C \\ D \\ E \\ F \end{bmatrix} = \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

Because the Vandermonde-like matrix is non-square, it cannot be inverted to solve for the polynomial coefficients. It can be solved, however, using its Moore-Penrose pseudo-inverse and performing a least squares fit to the polynomial coefficients. In an embodiment, the pseudo inverse is defined as:

$$pinv(X) = (X^T X)^{-1} X^T$$

$$pinv\begin{bmatrix} 1 & 1 & 1 & -1 & -1 & 1 \\ 0 & 0 & 1 & 0 & -1 & 1 \\ 1 & -1 & 1 & 1 & -1 & 1 \\ 1 & 0 & 0 & -1 & 0 & 1 \\ 0 & 0 & 0 & 0 & 0 & 1 \\ 1 & 0 & 0 & 1 & 0 & 1 \\ 1 & -1 & 1 & -1 & 1 & 1 \\ 0 & 0 & 1 & 0 & 1 & 1 \\ 1 & 1 & 1 & 1 & 1 & 1 \end{bmatrix} = \frac{1}{36}\begin{bmatrix} 6 & -12 & 6 & 6 & -12 & 6 & 6 & -12 & 6 \\ -9 & 0 & 9 & 0 & 0 & 0 & 9 & 0 & -9 \\ 6 & 6 & 6 & -12 & -12 & -12 & 6 & 6 & 6 \\ -6 & 0 & 6 & -6 & 0 & 6 & -6 & 0 & 6 \\ 6 & 6 & 6 & 0 & 0 & 0 & -6 & -6 & -6 \\ -4 & 8 & -4 & 8 & 20 & 8 & -4 & 8 & -4 \end{bmatrix}$$

giving:

$$\begin{bmatrix} A \\ B \\ C \\ D \\ E \\ F \end{bmatrix} = \frac{1}{36}\begin{bmatrix} 6 & -12 & 6 & 6 & -12 & 6 & 6 & -12 & 6 \\ -9 & 0 & 9 & 0 & 0 & 0 & 9 & 0 & -9 \\ 6 & 6 & 6 & -12 & -12 & -12 & 6 & 6 & 6 \\ -6 & 0 & 6 & -6 & 0 & 6 & -6 & 0 & 6 \\ 6 & 6 & 6 & 0 & 0 & 0 & -6 & -6 & -6 \\ -4 & 8 & -4 & 8 & 20 & 8 & -4 & 8 & -4 \end{bmatrix} \begin{bmatrix} z_{-1,1} \\ z_{0,1} \\ z_{1,1} \\ z_{-1,0} \\ z_{0,0} \\ z_{1,0} \\ z_{-1,-1} \\ z_{0,-1} \\ z_{1,-1} \end{bmatrix}$$

The polynomial coefficients are a linear combination of the signal strengths. The multiplications are slightly more complicated, but many of the multiplicands can be factored out and applied a single time near the end of the calculation. The purpose of this step is to find the maximum of a paraboloid. Accordingly, overall scale factors are irrelevant, and focus need only be on relative values and arguments which maximize the function, in an embodiment, many of the operations may be canceled out, improving the efficiency of implementation.

As above, the fine touch point is presumed at the maximum of the paraboloid, where both partial derivatives are zero:

$$\frac{\partial x}{\partial z} = 2Ax + By + D = 0 \text{ and}$$

$$\frac{\partial y}{\partial z} = Bx + 2Cy + E = 0$$

This will occur at the point $x_f$, $y_f$ where:

$$x_f = (BE - 2CD)/(4AC - B^2) \text{ and } y_f = (DB - 2AE)/(4AC - B^2)$$

For the eight-connected neighborhood, the values $x_f$ and $y_f$ are not independent of each other. Both depend on the signal strengths of all eight neighbors. Thus, this approach may have an increased computational burden and the possibility that certain combinations of signal strengths will produce singular values for the fine touch points. In an embodiment using the least-squares approach on the eight Moore neighbors, such an implementation is more robust against noisy signal strength values. In other words, in an embodiment, small errors in one signal strength will be compensated for by the increased amount of data used in the calculation, and the self-consistency of that data.

Moreover, the eight-connected neighborhood provides a B coefficient—an extra piece of information—that might prove useful as part of a user interface. The B coefficient of the xy cross-term can be used to characterize asymmetry in the fitted paraboloid and, along with the aspect ratio information inherent in the A and C coefficients, which could allow software to determine the angle at which a touch is occurring.

By way of example, a touch point with an elliptical cross section can be obtained by truncating the paraboloid at a particular z value. The values of a and b can be obtained from the A and C coefficients of the polynomial, and they provide information about the aspect ratio of the object touching the surface. For example, a finger or stylus would not necessarily be circularly symmetric, and the ratio of a to b could provide information about its shape.

Knowledge of the angle $\phi$ can provide information on the orientation of the ellipse, and might, for example, indicate which way a finger or stylus is pointing. $\phi$ can be calculated from the eigenvalues and eignevectors of the 2×2 matrix M given by the following:

$$M = \begin{bmatrix} A & B/2 \\ B/2 & C \end{bmatrix}$$

This matrix will have two eignevalues and two eigenvectors. The eigevector associated with the largest eigenvalue will point in the direction of the ellipse's major axis. The other eigenvector will point in the direction of the minor axis. The eigenvalues, $\lambda_1$ and $\lambda_2$ can be computed as follows:

$$\lambda_i = \frac{tr(M) \pm \sqrt{tr(M)^2 - 4det(M)}}{2}$$

Where tr(M) is the trace of the matrix M, which is equal to AC, and det(M) is the determinant of the matrix M, which is equal to $AC - B^2/4$.

Once the eigenvalues are obtained, the Cayley-Hamilton theorem can be used to compute the eigenvectors. The eigenvector associated with $\lambda_1$ is either of the columns of the matrix $M - \lambda_2 I$ and the eigenvector associated with $\lambda_2$ is either of the columns of the matrix $M - \lambda_1 I$. Note the reversal of the eigenvalue indexes. The angle $\phi$ that the major axis of the ellipse makes with respect to the x axis of our coordinate system is the arctangent of the slope of the eigenvector. The slope of the eigenvector is just $\Delta y/\Delta x$.

As discussed above, the interpolation step requires determining a fine touch point, e.g., using data acquired from a flattened heat map, but it is not necessarily limited to the illustrative paraboloid model discussed above. The purpose of determining a fine touch point is to permit the postprocessor to provide better granularity in touch points, and specifically, to provide granularity that exceeds the sensor's intersections. Stated another way, the modeled and interpolated fine touch point can land directly on a row/column intersection, or anywhere in between the intersections. There may be a tradeoff between the accuracy of the model and its computational requirements; similarly, there may be a tradeoff between the accuracy of the model and its ability to provide an interpolated fine touch point that corresponds with the actual touch. Thus, in an embodiment, a model is selected to require the smallest computational load while providing sufficient correspondence between the interpolated touch point and the actual touch. In an embodiment, a model is selected to require sufficient correspondence between the interpolated touch point and the actual touch, and the processing hardware is selected to accommodate the computational load of the model. In an embodiment, a model is selected that does not exceed the computational capacity of pre-selected hardware and/or other software operating the touch interface.

Turning to the frame matching procedure, to properly track objects moving on the touch surface over time, it is important to match the calculated touch points to each other across frame boundaries, and thus, e.g., to track objects moving on the touch surface as they move. Thus, in an embodiment, each calculated touch point in one frame should be identified in, or have another disposition (e.g., removed) in, the subsequent frame. While this represents a fundamentally difficult problem, which could be insoluble in the general case, in an embodiment, a solution is implemented using both geometry and the laws of physics. Because the items that are in contact with the touch surface are of finite size and move according to certain physical principles, in an embodiment, certain cases can be ignored as being outside of plausible ranges. Moreover, in an embodiment, a frame rate should be selected to be sufficiently high to permit object tracking (that is, frame-to-frame touch point tracking) with reasonable certainty. Thus, for example, where objects to be tracked are either known to move at a maximum rate across the touch surface or the tracking is designed to track the objects only up to a maximum rate, a frame rate can be selected that will permit tracking with reasonable certainty. For example, if a maximum rate of movement across the rows or columns of the touch surface is, e.g., 1000 rows or columns per second, then a frame rate of 1000 Hz will "see" an object move no more than 1 row or column per frame. In an embodiment, touch point interpolation (as discussed above) can provide a more precise measure of the touch point location, and thus, intra-row and intra-column positions are readily identifiable as described more fully herein.

Fingers and styluses have a minimum size and are, in most cases, unlikely to approach each other closely enough to cause an ambiguous case. They also travel at speeds characteristic of the motion of a human arm and its parts (e.g., wrist, elbow, fingers, etc.), which provides bounds. In an embodiment, a touch surface has an update rate on the order of one kilohertz or more, thus, fingers and styluses touching the surface cannot move very far or at extreme angles during the update period from one frame to the next. Because of the limited distances and angles, tracking can be performed according to the present disclosure by comparing data from one frame to one or more past frames.

In an embodiment, data concerning past frames (e.g., a heat map) may be maintained in a temporary buffer. In an embodiment, processed data concerning past frames (e.g., field flattened heat map or fitted polynomial coefficients) may be maintained in a temporary buffer. In an embodiment, the data concerning a past frame that is maintained in a temporary buffer may include, or may consist of, an interpolated fine touch point coordinate for each fine touch point in the prior frame, and, to the extent such exists, vectors concerning prior motion of those fine touch points. The temporary buffer may retain data concerning one or more past frames, and may cease to retain the data when it is no longer relevant to later calculations.

In an embodiment, the frame matching process initially presumes that an object's touch point in the current frame i is probably the touch point in the prior frame (i.e., i−1) which is geometrically closest to it.

In an embodiment, data concerning the motion of a touch point (e.g., velocity and direction) are determined and stored in connection with one or more frames. In an embodiment, data concerning the motion of a touch point is used to predict a likely location for that touch point in the next frame. Data concerning the motion of a touch point may comprise, for example, velocity or change in position, and may come from one or more prior frames. In an embodiment, predicting a likely location in a frame is done by considering the motion between two frames—yielding a per-frame displacement and its direction. In an embodiment, predicting a likely location in a frame is done by considering the motion in three or more frames. Using fine touch point positional information from three or more frames may yield a more precise prediction as it can take into account acceleration and changes of direction in addition to per-frame displacement and direction. In an embodiment, more weight is assigned to more recent frame data than to older frame data. A frame matching process may initially presume that an object's touch point in the current frame i is more likely to correspond with the touch point in the prior frame (i.e., i−1) that is associated with the predicted likely location closest to the touch point in the current frame.

In an embodiment, data concerning the size (magnitude) of a touch point (e.g., the A and C coefficients of a paraboloid) is determined and stored in connection with one or more frames. A frame matching process may initially presume that the size of a given object in the current frame i probably corresponds with the size of that object in the prior frame (i.e., i−1).

In an embodiment, data concerning the change in size (magnitude) of a touch point over time are determined and stored in connection with one or more frames. In an embodiment, data concerning the change in size of a touch point in a frame (e.g., since the last frame, or over a plurality of frames) is used to predict a likely size for that touch point in the next frame. A frame matching process may initially presume that an object in the current frame i is more likely to correspond with an object in the prior frame (i.e., i−1) that is associated with the predicted likely size nearest the size of the touch point in the current frame.

In an embodiment, data concerning the change in rotational orientation (e.g., the B coefficient of a paraboloid) of a touch point over time are determined and stored in connection with one or more frames. In an embodiment, data concerning the rotational orientation of a touch point in a frame (e.g., since the last frame, or over a plurality of frames) is used to predict a rotational orientation for that touch point in the next frame. A frame matching process may initially presume that an object in the current frame i is more likely to correspond with an object in the prior frame (i.e., i−1) that is associated with the predicted likely rotational orientation nearest the rotational orientation of the touch point in the current frame. In an embodiment, the rotational orientation of a touch point could permit single touch point control (e.g., single finger control) of rotation, thus, for example, the rotation of one finger on a screen could provide sufficient information to, for example, rotate a view—a function that traditionally requires two rotating points of contact with a touch surface. Using data describing rotational orientation over time, rotational velocity can be computed. Similarly, data concerning rotational orientation or rotational velocity can be used to compute rotational acceleration. Thus, rotational velocity and rotational acceleration both utilize rotational orientation. Rotational orientation, rotational velocity and/or rotational acceleration may be computed for a touch point and output by or used by the frame matching process.

In an embodiment, heuristics for frame matching include changes in distance and in the velocity vectors of the touch points. In an embodiment, heuristics for frame matching include, without limitation, one or more of the following:

an object's touch point in frame i+1 is more likely the touch point in frame i which is geometrically closest to it;

an object's touch point in frame i+1 is more likely the touch point in frame i which is closest to the point where it would be predicted to be given the object's velocity history; and an object's touch point in frame i+1 is more likely of a similar size to its touch point in frame i.

Other combinations of historical data may be used without departing from the scope of this disclosure. In an embodiment, both prior positions and the velocity histories may be used in a heuristic frame matching process. In an embodiment, prior positions, the velocity histories and size histories may be used in a heuristic frame matching process. In an embodiment, prior positions and other historical information may be used in a heuristic frame matching process. In an embodiment, historical information over a plurality of frames is used in a heuristic frame matching process. Other combinations will be apparent to one of skill in the art in view of the foregoing disclosure.

In U.S. patent application Ser. No. 14/216,791, filed Mar. 17, 2014, entitled "Fast Multi-Touch Noise Reduction," methods and systems are provided to overcome certain conditions in which noise produces interference with, or phantom touches in, the Fast Multi-Touch (FMT) sensor. The entire disclosure of this application is incorporated herein by reference. In an embodiment, unique signals may be transmitted on all rows and columns. In an embodiment, unique signals may be transmitted on each row in one or more subsets of rows. In an embodiment, unique signals may be transmitted on each column in one or more subsets of columns. In an embodiment, all rows and columns are configured to detect the unique signals. In an embodiment, each row in one or more subsets of rows is configured to detect the unique signals. In an embodiment, each column in one or more subsets of columns is configured to detect the unique signals.

As disclosed in U.S. patent application Ser. No. 14/603,104, filed Jan. 22, 2015, entitled "Dynamic Assignment of Possible Channels in a Touch Sensor," a system and method enables a touch sensor to reduce or eliminate such false or noisy readings and maintain a high signal-to-noise ratio, even if it is proximate to interfering electromagnetic noise from other computer system components or unwanted external signals. This method can also be used to dynamically reconfigure the signal modulation scheme governing select portions or the entire surface-area of a touch sensor at a given point in time in order to lower the sensor's total power consumption, while still optimizing the sensor's overall performance in terms of parallelism, latency, sample-rate, dynamic range, sensing granularity, etc. The entire disclosure of the application is incorporated herein by reference.

Keyboard Embodiment

Use of physical keyboards in virtual reality or augmented reality (hereinafter, "VR/AR," even though the two terms can be mutually exclusive) settings is complicated by the fact that a user may not have any view, or a full view, of the keyboard when within the VR/AR setting. The keyboard and keyboard switches disclosed herein render one or more keys, a touch surface, or a keyboard into a sensitive, dynamic, hover, contact and pressure sensitive surface that can be used for both traditional keyboard or keying applications, as well as numerous new applications enabled by the additional information available from the keys or surfaces. In an embodiment, a physical keyboard is described that can sense not only the traditional keyboard inputs, but may be able to distinguish finger-key contact and finger hover, thus enabling determination of the respective positions of a user's fingers, hands, wrists and potentially forearms when the keyboard is being used. In an embodiment, the keyboard data is used to reconstruct the position and orientation of the user's fingers, hands, wrists, forearms, and potentially, the keyboard (including changes to the keyboard such as the addition of key-top or side labels, or e.g., tool tips) in a VR/AR setting. Such reconstruction allows the user to "see" his or her fingers, hands, wrists and possibly forearms relative to the keyboard VR/AR settings, making the use of a keyboard possible in VR/AR settings.

Turning first to FIGS. 1A-1D, an illustrative embodiment of a keyboard switch 110 is shown. In an embodiment, key base 100 supports the other elements of the keyboard switch 110. In an embodiment, key cover 101 is provided in movable relation to the key base 100. In an embodiment, key cover 101 is only partially movable with respect to the key base 100. In an embodiment, a biasing means (not shown) urges key cover 101 to its extended position when at rest, and as is apparent to those of skill in the art, key cover 101 moves in a direction roughly normal to its upper surface.

In an embodiment, two antennae 102, 103 are associated with the keyboard switch 110, one of the two antennae being a receive antenna 103, and the other being a transmit antenna 102. The designation of transmit or receive is arbitrary, except that in an embodiment, at least one of each is associated with the keyboard switch. The two antennae 102, 103 are spaced apart from one another such that no portion of transmit antenna 102 touches any portion of receive antenna 103. In an embodiment, keyboard switch 110 shares its antennae 102, 103 with one or more other keys. In an embodiment, keyboard switch 110 comprises one unique antenna, and shares its other antenna with one or more other keys. As will be discussed more fully below, keyboard switch 110 may be a sole keyboard switch, or more commonly, may be used with a plurality of other keyboard switches in a keyboard.

In an embodiment, one antenna is a transmit antenna 102 and the other antenna is a receive antenna 103. In an embodiment, a keyboard switch 110 may have one or more additional transmit antenna (not shown). In an embodiment, a keyboard switch 110 may have one or more additional receive antenna (not shown). Each of the antennae associated with any keyboard switch 110 is spaced apart from each other antennae such that no portion of any of the antennae touches any portion of any other antennae.

Although shown in an exemplary embodiment on the front and back sides of the key base 100, the antennae may be placed as will best suit the intended application. For example, in varying embodiments, 1) a transmit antenna is placed on one side of the key, and a receive antennae on the other side;
2) a transmit antenna is placed within the key base, and a receive antenna rings around the key base;
3) transmit antennae are placed on each side of the key base, and a receive antenna is placed in the center of the key base;
4) receive antennae are placed on each side of the key base, and a transmit antenna is placed in the center of the key base; or
5) transmit antennae are placed on each side of the key base, and receive antennae are placed on the front and rear of the key base.

Many other configurations will be apparent to a person of skill in the art in view of this disclosure, and can be made without departing from the spirit and scope of the inventions claimed herein.

In an embodiment, the antennae 102, 103 are fixed, and do not move relative to one another when the key cover 101 is moved or depressed. In an embodiment, at least one of antennae 102, 103 can move relative to the other. In an embodiment, at least one of antennae 102, 103 moves relative to the other when key cover 101 is moved or depressed. Movement (or lack of movement) of the antennae may result in a differing response to the key press than where the antennae are stationary. As will be appreciated by a person of skill in the art, where the pressure or level of key press requires substantial granularity—that is, a very sensitive measure of how much the key cover 101 is pressed—it may be desirable to have at least one of the antenna 102, 103 move as a result of that key cover 101 press. One or more antennae moving in response to the movement of the key cover 101 is also desirable where the object pressing the key has limited capacitive implication (e.g., typing using long fingernails, typing with gloves on, typing with a pencil or other object, typing underwater, etc.).

In an embodiment, a transmit antennae 102 is associated with a signal emitter (not shown). In an embodiment, the antennae 102, 103 form a touch sensor when a signal is transmitted onto the transmit antenna 102 and a receiver (not shown) receives the signals present on a receive antenna 103. In an embodiment, a signal processor (not shown) is used to determine an amount, and/or changes in the amount, of the signal transmitted onto the transmit antenna 102 that is present in the signals on the receive antenna 103. In an embodiment, the transmit antenna 102 and receive antenna 103 are designed so that, when they are not subject to a touch event, one amount of signal is coupled between them, whereas, when they are subject to a touch event, another amount of signal is coupled between them. Moreover, in an embodiment, the transmit antenna 102 and receive antenna 103 are designed so that the amount of signal coupled between them varies with the various touch events, from the farthest hover, through key contact, and all the way to a fully depressed key. In an embodiment, the variation in signal from the farthest hover to a fully depressed key comprises a range of detectable touch states, which may comprise at least three touch states (i.e., hover, contact and depressed) in addition to an untouched state. In an embodiment, the variation in signal representing the hover touch state comprise a plurality of discrete levels. In an embodiment, the variation in signal representing the contact touch state comprise a plurality of discrete levels. In an embodiment, the variation in signal from the farthest hover to a fully depressed key comprises a range of detectable touch states, which comprises at least 255 or more touch states in addition to an untouched state. As discussed above, because the touch sensor ultimately detects touch due to a change in the coupling, it is not of specific importance, except for reasons that may otherwise be apparent to a particular embodiment, whether the touch-related coupling causes an increase in the amount of signal present on the receive antenna 103 or a decrease in the amount of signal present on the receive antenna 103.

To identify touch, the receiver receives signals present on the receive antenna 103 and a signal processor analyzes the received signal to determine the amount of the coupled transmitted signal. In an embodiment, the identification can be supported with a frequency analysis technique (e.g., Fourier transform), or by using a filter bank. In an embodiment, the receiver receives a frame of signals, which frame is processed through an FFT, and thus, a measure is determined for at least the transmitted frequency. In an embodiment, the FFT provides an in-phase and quadrature measure for at least the transmit frequency, for each frame.

In an embodiment, a signal emitter is conductively coupled to transmit antenna 102 for the keyboard switch 110. The signal emitter emits a source signal causing the transmit antenna 102 associated therewith to transmit the source signals. The source signal may be a combination of e.g., other signals, thus, for example, while the source signal could be a simple sine wave (e.g., 5.01 Mhz), it is also within the scope of this disclosure that the source signal is a combination of two or more sine waves. In an embodiment, more than one signal emitters may be conductively coupled to transmit antenna 102 for the keyboard switch 110. Where more than one signal emitters are conductively coupled to a transmit antenna 102, the output of the more than one signal emitters provide the signals transmitted by the transmit antenna 102. In an embodiment, transmission of multiple source signals may increase sensitivity. In an embodiment, transmission of multiple source signals may increase sensitivity further if high and low frequency signals are combined. In an embodiment, the source signals are frequency-orthogonal. As previously used herein, frequency-orthogonal means that the source signals are separable and distinguishable from each other. In an embodiment, the receiver is coupled to the receive antenna 103, and adapted to capture a frame of signals present on the coupled receive antenna 103. Where another receive antenna (not shown) is associated with the keyboard switch 110, the additional receive antenna may share the same receiver (and thus, as would be apparent to one of skill in the art, could be considered different parts of the same antenna), or alternatively, may be conductively coupled to a separate receiver.

In an embodiment, multiple orthogonal signals are transmitted over the transmit antenna 102. To identify touch in such embodiment, the receiver receives signals present on the receive antenna 103 and a signal processor analyzes the received signals to determine an amount corresponding to each of the orthogonal transmitted signal coupled between them. The identification can be supported with a frequency analysis technique (e.g., Fourier transform), or by using a filter bank. In an embodiment, the receiver receives a frame of signals, which frame is processed through an FFT, and thus, a measure is determined for each transmitted frequency. In an embodiment, the FFT provides an in-phase and quadrature measure for each transmit frequency, for each frame.

In an embodiment, from the received signal, the receiver/signal processor can determine a value (and in an embodiment an in-phase and quadrature value) for each frequency, from a list of frequencies, found in the signal received on that receive antenna 103. In an embodiment, where the value corresponding to a frequency is greater or lower than some threshold, or changes from a prior value (or changes from a prior value by an amount greater than a threshold), that information may be used to identify a touch event at the keyboard switch 110. In an embodiment, the value information, which may correspond to various physical phenomena including the distance of the touch from the keyboard switch 110, the size of the touch object, the pressure with which the object is pressing on the keyboard switch, any fraction of key cover 101 that is being touched, etc., may be used to identify the touch state from the range of detectable touch states. In an embodiment, changes in the value information may be used to identify the touch state from the range of detectable touch states. In an embodiment, the determined values are not self-determinative of touch state, but rather are further processed along with other values to determine touch states. In an embodiment, the determined values are further processed along with values from other keyboard switches proximate to the keyboard switch 110 to determine the touch state of the keyboard switch 110.

In an embodiment, antennae 102, 103 associated with a keyboard switch 110 are shaped similarly. In an embodiment, antennae 102, 103 associated with a keyboard switch 110 are shaped differently. The different shaped antennae 102, 103 produce different antennae patterns based on the shape of the antennae 102, 103. As will be apparent to a person of skill in the art in view of this disclosure, antennae 102, 103 associated with a keyboard switch 110 may be oriented in different spatial orientations to produce differing antennae patterns. In an embodiment, each respective transmit and receive antennae 102, 103 is associated with a transmission or reception layer, thereby resulting in a multi-layer construction of the keyboard switch 110.

In an embodiment, a signal processor is adapted to determine a measurement from each frame corresponding to an amount of the source signals present on the receive antenna 103. In an embodiment, the signal processor is further adapted to determine a keyboard switch touch state from the range of touch states, based at least in part on the corresponding measurement.

The keyboard switch 110 may be a sole keyboard switch, or more commonly, may be used with a plurality of other keyboard switches in a keyboard (not shown). In an embodiment, a keyboard is composed of a collection of keyboard switches 110. In an embodiment, keyboard switches 110 are organized into logical rows and logical columns such that each of the plurality of keyboard switches is associated with, and uniquely identified by, one row and one column. In an embodiment, keyboard switches 110 may be organized into logical rows and logical columns such that each of the plurality of keyboard switches are associated with, and uniquely identified by, at least one row and one column.

In an embodiment, no two keyboard switches in a keyboard may share a common row/column combination, thus, the keyboard can detect a measure that is unique to a respective keyboard switch 110. In an embodiment, each keyboard switch 110 operates as a proximity sensor by transmitting a signal over an antenna 102 and receiving coupled signal on the another antenna 103. As discussed above, for each keyboard switch 110 a value associated with touch at that keyboard switch 110 may be derived from the amount, or a change in the amount, of the transmitted signal found in the coupled signal. The value may be correlated with one of a range of touch states. In an embodiment, the range of touch states include no hover, hover, contact, and pressed or depressed. In an embodiment, "no hover" means there is no detection of the user's fingers, hand, or forearm in the vicinity of the keyboard switch 110. As used here, generally, "hover" refers to a touch state corresponding to detectable location of a capacitive object (e.g., user's fingers, hands, forearm or stylus) from the limit of detection of the keyboard switch through but not including include actual contact with the keyboard switch or keyboard. As used here, generally, "contact" refers to a touch state corresponding to a detectable contact between the keyboard switch or keyboard and the capacitive object, all the way through being pressed. Being pressed, or depressed corresponds with the traditional notion of a key being closed, e.g., when a corresponding character would be put on the screen. As used here, however, "depressed" or "pressed" refers to a touch state corresponding to the detection of a fully depressed key, and may also include various additional states corresponding to the pressure on the key after being fully depressed. In an embodiment, the touch states may use an ordinal scale, e.g., from 0 to 255, with zero corresponding to a no touch state, a first range, e.g., 1 to 127 corresponding to various hover states, a second range, e.g., 128-197 corresponding to various contact states, and a third range, e.g., 198-255 corresponding to a range of pressed states. In an embodiment, the range of touch states comprises at least four states. In an embodiment, the range of touch states comprises at least 6 states, with at least two substates corresponding to hover and contact. In an embodiment, the range of touch states comprises at least 256 states, with at least three substates corresponding to hover, contact and pressed. In an embodiment, the range of touch states comprises at least 1024 states. As will be apparent to a person of skill in the art in view of this disclosure, the number of touch states and association between those states and any substates are design choices and should be selected to provide the desired granularity for the keyboard switch. Moreover, it is not necessary for substates to have equal granularity with other substates. For example, in an embodiment, it may be desirable (as discussed in more detail in connection with FIGS. 4A and 4B), to have more granularity on the contact states or on the division between the hover state and the contact state. Similarly, in an embodiment, it may be more desirable to have additional granularity on hover states or pressed states. Notably, the novel touch sensitive keys disclosed herein (both above and below) may be used with or without a traditional mechanical contact that detects a keystroke. Thus, in an embodiment, the capacitive key switch as disclosed herein can be used to report touch and varying levels of depression, while a traditional mechanical contact (or other indicator) can be used to positively identify a keystroke.

In an embodiment, using these states, the keyboard switches 110 on the keyboard can provide granular, multi-level information relative to user's fingers on (and potentially between) the respective keyboard switches 110. For example, in an embodiment, as the key cover 101 is depressed, the keyboard may detect a change in the surface area of the key in contact with the finger. Further, in an embodiment, as the key is depressed the key cover 101 is closer to the conductor, and thus, both the change in the surface area and the proximity of the capacitive object to the conductor may result in capacitive change, which provides information relative to the user's finger on the keyboard switches.

Figure 2A:
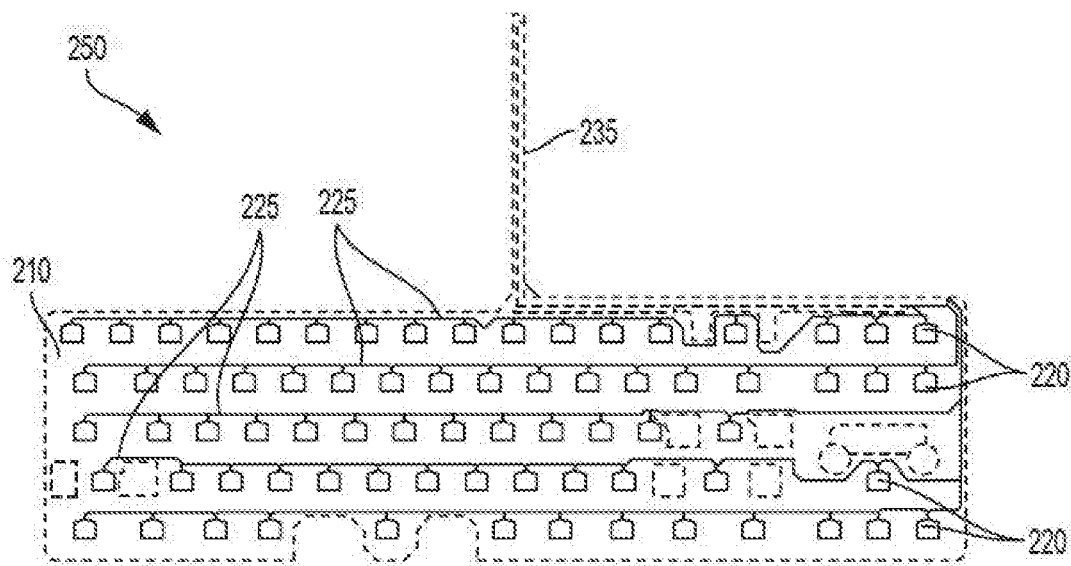
FIGS. 2A and 2B show exemplary transmission and reception layers of a keyboard using the exemplary keyboard switch shown in FIGS. 1A-1D.
Figure 2B:
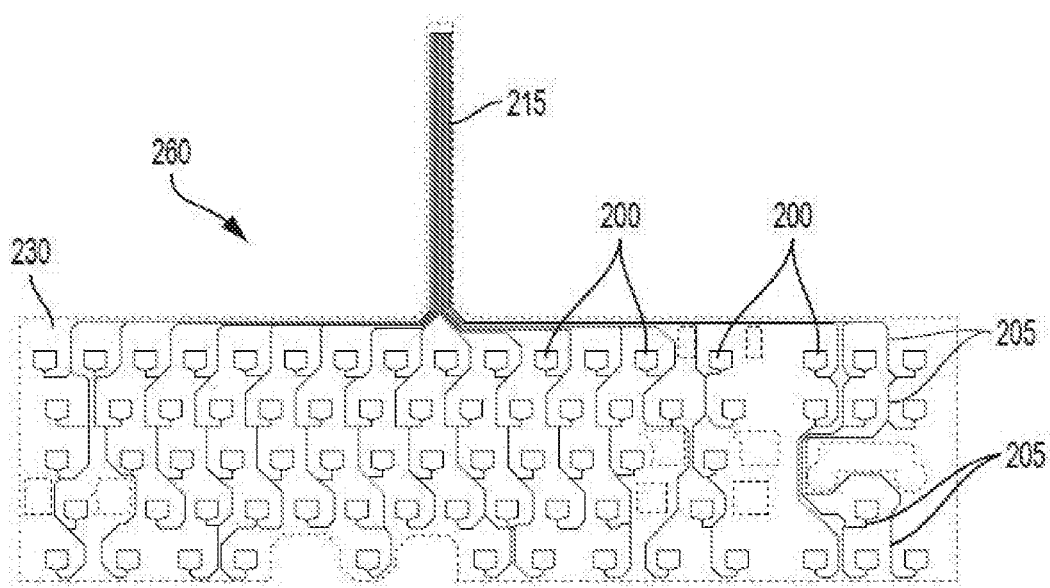

FIGS. 2A and 2B show antennae layers for an embodiment of an exemplary typical keyboard. FIG. 2A shows an exemplary illustration of conductively coupled columns (shown horizontally) of a plurality of transmit antennae 220. (The designation of rows and columns being arbitrary.) Transmit traces 225 are traced along the transmit layer 210 connect groups of transmit antennae 220 together, and bundle together at bundle 235. FIG. 2B shows an exemplary illustration of a plurality of receive antennae 200 organized into conductively coupled rows (shown vertically). Receive traces 205 are traced along the receive layer 230, to a bundle 215. Antenna layers 250, 260 are separated and stacked in a keyboard (not shown) having a plurality of key bases (not shown), each of the bases having a key cover (not shown). In an embodiment, the antennae 220, 200 form the transmit antenna 102 and receive antenna 103 (see, e.g., FIG. 1B) of each keyboard switch (not shown).

In an embodiment, a signal emitter (not shown) is conductively coupled with each transmit trace 225, and via the emitters, a plurality of signals are transmitted over each of the transmit antenna 220 rows, respectively. In an embodiment, each of the plurality of signals is orthogonal to each of the other plurality of signals. In an embodiment, the plurality of signals are simultaneously transmitted over each of the transmit antenna 102.

A receiver (not shown) is conductively coupled with each of the receive traces 205. The receiver and/or a signal processor (not shown) associated therewith is adapted to receive frames of signals present on the receive traces 205 (i.e., coming from the receive antennae 200) and from the frame, to determine a value for each of the plurality of signals transmitted over each of the transmit antenna 102. In an embodiment, each value is correlated with one of a range of touch states, and all of the values together, producing a keyboard state. In an embodiment, each keyboard switch in the keyboard is associated with one of a range of touch states, and that association is computed based at least in part on the value associated with that keyboard switch. In an embodiment, the association is computed based, at least in part, on the value associated with that keyboard switch, and the value associated with at least one neighboring keyboard switch.

Determination of value for each of the plurality of signals are transmitted over each of the transmit antenna 102 can be supported with a frequency analysis technique (e.g., Fourier transform), or by using a filter bank. In an embodiment, the receiver receives a frame of signals, which frame is processed through an FFT, and thus, a measure is determined for each transmitted frequency. In an embodiment, the FFT provides an in-phase and quadrature measure for each transmit frequency, for each frame.

While at least one of the plurality of signals sent via the transmitters are sent via each transmit antenna 102, in an embodiment, at least one transmit antenna 102 simultaneously transmits a second one of the plurality of signals. In an embodiment, a plurality of orthogonal signals are simultaneously transmitted such that at least two of the orthogonal signals are simultaneously transmitted over each transmit antenna 102. In an embodiment, simultaneous transmission of multiple signals over a single transmit antenna may increase sensitivity. In an embodiment, frequency-distant orthogonal signals are simultaneously transmitted over a single transmit antenna 102.

Figure 4A:
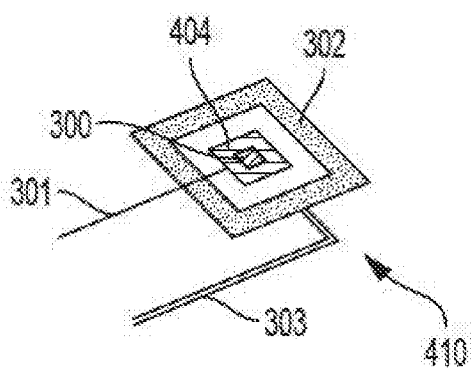
FIGS. 4A and 4B show yet another exemplary embodiment of the keyboard switch.
Figure 4B:
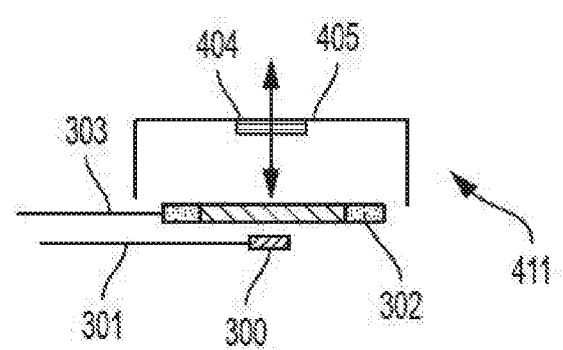
Figure 5:
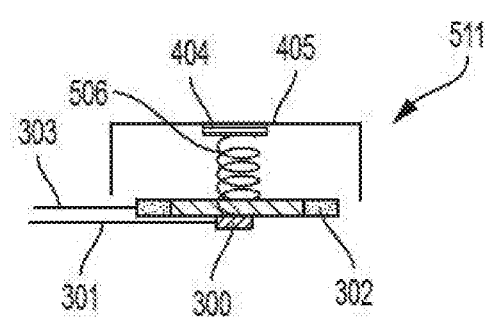
FIG. 5 shows a further exemplary embodiment of the keyboard switch.
Figure 6:
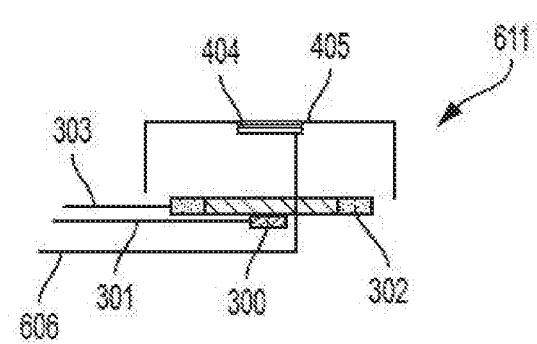
FIG. 6 shows a still further exemplary embodiment of the keyboard switch.

Turning to FIGS. 3A-6, several additional, exemplary embodiments of a keyboard switch are shown. As with the keyboard switch 110 shown in FIGS. 1A-1D, the keyboard switches shown in FIGS. 3A-6 can be used alone or as part of a keypad or keyboard. While the keyboard switches disclosed in FIGS. 3A-6 can be used in many types of keyboards, they are particularly useful in the design of non-traditional keyboards, e.g., thinner keyboards such as "chicklet" (or island style) keyboards and membrane keyboards. The keyboard switches disclosed in FIGS. 3A-5 are shown with a single transmit antenna and a single receive antenna. Without departing from the spirit and scope of this disclosure, these keyboard switches can have one or more additional transmit antennae and/or one or more additional receive antenna. For example, as discussed in more detail below, FIG. 6 shows an embodiment having two transmit antennae.

As with the previously discussed keyboard switch 110 illustrated in FIGS. 1A-1D, in an embodiment, the keyboard switches disclosed in FIGS. 3A-5 each transmit a single frequency over its transmit antenna. Also as with the previously discussed keyboard switch illustrated in FIGS. 1A-1D, in an embodiment, the keyboard switches disclosed in FIGS. 3A-5 each transmit a plurality of orthogonal signals over its transmit antenna. The keyboard switch illustrated in FIG. 6 having two transmit antennae, may similarly be used with a single transmit frequency, or with multiple, simultaneous, orthogonal transmit frequencies.

Figure 3A:
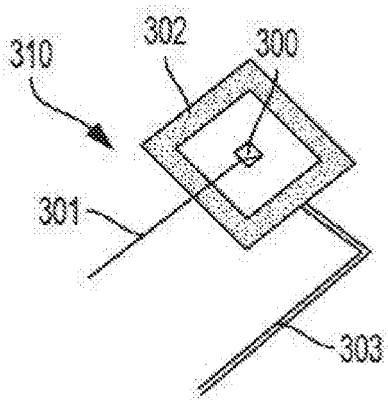
FIGS. 3A and 3B show another exemplary embodiment of a keyboard switch.
Figure 3B:
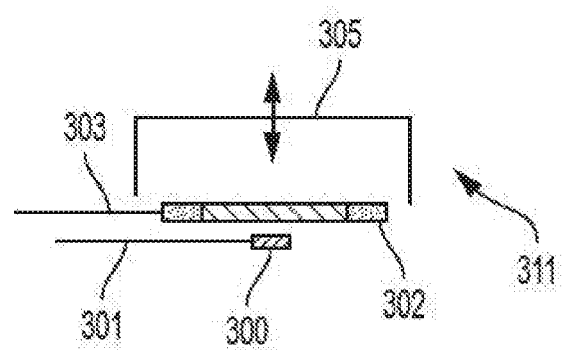

FIG. 3A shows an illustrative orientation of antennae components 310 of a keyboard switch comprising a transmit antenna 300 and transmit trace 301 conductively coupled thereto, as well as receive antenna 302 and receive trace 303 conductively coupled thereto. As will be understood by a person of skill in the art, the designation of transmit and receive here are arbitrary, and the transmit antenna 300 could be used to receive, while the receive antenna 302 could be used to transmit; these arbitrary designations are merely a convenience for illustrative purposes. In an embodiment, a signal emitter (not shown) emits one or more signals for transmission on the transmit antenna 300 via the transmit trace 301, and a receiver (not shown) receives a frame of signal present on the receive antenna 302 via the receive trace 303. A signal processor (not shown) analyzes the frame to determine a value corresponding to an amount of the one or more signals transmitted on the transmit antenna 300. The value (or a change in the value) may be correlated with one of a range of touch states. FIG. 3B shows a schematic view of a keyboard switch 311 using the illustrative orientation of antennae components 310 in FIG. 3A. Keyboard switch 311 comprises a key cover 305 that covers the antennae components 310. In an embodiment, a user can interact with the key cover 305 as the key of a keyboard. In an embodiment, key cover 305 has a biasing means (not shown), such as a spring, that biases it towards a home position away from antennae components 310. In an embodiment, key cover 305 is made from a deformable memory material that itself will return to a home shape away from antennae components 310.

As discussed in detail above, in an embodiment, a capacitive object, including, e.g., a user's hand or finger, or a stylus, is detected by a touch detector formed using the antennae 300, 302, and one of a range of touch states may thereby be associated with the keyboard switch 311. Also as discussed above, in an embodiment, the keyboard switch 311 is suitable for use in a keyboard. In an embodiment, rows and columns are associated with each of a matrix of keyboard switches. In an embodiment, the touch state of the key may be determined, at least in part, based on information detected by the touch detector formed using the antennae 300, 302, or changes in that information. In an embodiment, the touch state of the keyboard switch may be determined, at least in part, based on information detected (or changes in information detected) by the antennae of another proximate keyboard switch.

FIG. 4A shows an illustrative orientation of antennae components 410 of a keyboard switch having a transmit antenna 300 and transmit trace 301 conductively coupled thereto, as well as receive antenna 302 and receive trace 303 conductively coupled thereto. Conductive substrate 404 is also shown. As above, the designation of transmit and receive are arbitrary. In an embodiment, a signal emitter (not shown) emits one or more signals for transmission on the transmit antenna 300 via the transmit trace 301, and a receiver (not shown) receives a frame of signal present on the receive antenna 302 via the receive trace 303. A signal processor (not shown) analyzes the frame to determine a value corresponding to an amount of the one or more signals transmitted on the transmit antenna 300. The value (or a change in value) may be correlated with one of a range of touch states.

Turning now to FIG. 4B a schematic view of a keyboard switch 411 using the illustrative orientation of antennae components 410 in FIG. 4A. Keyboard switch 411 comprises a key cover 405 that covers the antennae components 410. In an embodiment, key cover 405 has a biasing means (not shown) that biases it towards a home position when it is not being contacted. In an embodiment, the biasing means may be a spring. In an embodiment, the biasing means may comprise a flexible deformable key cover. A conductive substrate 404 is positioned at the underside of the key cover 405. In an embodiment, the conductive substrate 404 is adapted to move in unison with at least a portion of the upper surface of the key cover 405. In an embodiment, the conductive substrate 404 may act to magnify the capacitive effect of a capacitive object brought into contact therewith. In an embodiment, the conductive substrate 404 causes a more measurable response from the touch detector in the transition between the touch states of hover and contact. In an embodiment, the conductive substrate 404 may be used to enhance the measurable range of touch states when a capacitive object is in contact with the key cover 405, thus, improving the granularity of the measurable states in the touch sensor. In an embodiment, the conductive substrate 404 is a solid conductive material. In an embodiment, the conductive substrate 404 is conductive mesh material. In an embodiment, conductive properties of conductive substrate 404 differ from the conductive properties of key cover 405. In an embodiment, conductive substrate 404 is affixed to key cover 405 using a gluing process. In an embodiment, the conductive substrate 404 is affixed to key cover 405 so that a conductive portion of the conductive substrate 404 protrudes through key cover 405 and may be contacted directly by a capacitive object. In an embodiment, conductive substrate 404 and key cover 405 are formed from the same material, conductive substrate 404 having a greater thickness than the upper portion of key cover 405. In an embodiment, conductive substrate 404 and key cover 405 are molded as a single object. Keyboard switch 411 can be used in the same manner as keyboard switch 311, however, the addition of the capacitive substrate 404 may enhance the detection of contact, and may provide better measurable granularity among contact touch states.

Turning now to FIG. 5 another embodiment of a keyboard switch 511 is shown in a schematic cutaway view. Keyboard switch 511 comprises many common components with keyboard switch 411 (FIG. 4B), including transmit antenna 300, transmit trace 301, receive antenna 302, receive trace 303, as well as key cover 405 and conductive substrate 404. Keyboard switch 511 is also operated similarly to keyboard switch 411 using a signal emitter (not shown) and receiver (not shown). Keyboard switch 511 further comprises a conductive coupling 506 between conductive substrate 404 and transmit antenna 300. In an embodiment, the conductive coupling may form the biasing means, such as a spring (e.g., a coil spring or a leaf spring), that urges key cover 405 to a home position. The conductive coupling 506 between conductive substrate 404 and transmit antenna 300 causes conductive substrate 404 to operate as a further antenna for transmission of transmit signals. In an embodiment, transmit antenna 300, conductive substrate 404 and conductive coupling 506, together, form a single, moveable antenna that can be used to transmit the transmit signals (or receive the signals if attached to a receiver).

FIG. 6 shows a schematic cutaway view of an embodiment of yet another keyboard switch 611, this one having two transmit antennae (or two receive antennae). Keyboard switch 611 comprises many common components with keyboard switch 411 (FIG. 4B), including transmit antenna 300, transmit trace 301, receive antenna 302, receive trace 303, as well as key cover 405 and conductive substrate 404. To the extent of its common components, keyboard switch 611 is operated similarly to keyboard switch 411 using a signal emitter (not shown) and receiver (not shown). Keyboard switch 611 further comprises a conductive lead 606 conductively coupled to conductive substrate 404. A further signal emitter (not shown) is conductively coupled to the conductive lead 606. The further signal emitter emits one or more further signals for transmission on the conductive substrate 404. In an embodiment, the one or more further signals are orthogonal to the one or more signals transmitted on the transmit antenna 300. The signal processor (not shown) also analyzes the frame of signals received by receiver, to determine a further value corresponding to an amount of the one or more further signals transmitted on the conductive substrate 404. In an embodiment, the further value (or a change in the further value) may be correlated with one of a range of touch states. In an embodiment, the value (corresponding to the one or more signals) and the further value (corresponding to the one or more further signals) are both used as a basis for identification of a touch state associated with the keyboard switch. As in other embodiments, the values (and further values) from neighboring or proximate keys may additionally be used as at least part of the basis for identifying a touch state associated with the keyboard switch. Without departing from the spirit and scope of this disclosure, instead of having two transmit antennae and one receive antenna, the keyboard switch 611 can have two receive antennae and one transmit antenna.

In an embodiment, the range of touch states provided by the various keyboard switches in a keyboard can be used to model a capacitive object and its position and orientation with respect to the keyboard. In an embodiment, such modeling can be used to provide visual feedback, including a visual 3-D model of the capacitive object, in a VR/AR setting. For example, an overlay of 2-D and 3-D "holographic" visual feedback in VR/AR settings can be based on the real-world positions of the user's fingers, hands, wrists and forearms on or in proximity to a physical keyboard made of touch detecting keyboard switches. Further, because the keyboard can make fine measurements of the location of capacitive objects relative to a keyboard, the touch measurements can be used to recreate the location and orientation of fingers, hands and possibly other parts including wrists and/or forearms because there are a limited number of ways in which a hand and forearm can move relative to the fingers—e.g., finite ranges and degrees of freedom.

Figure 7:
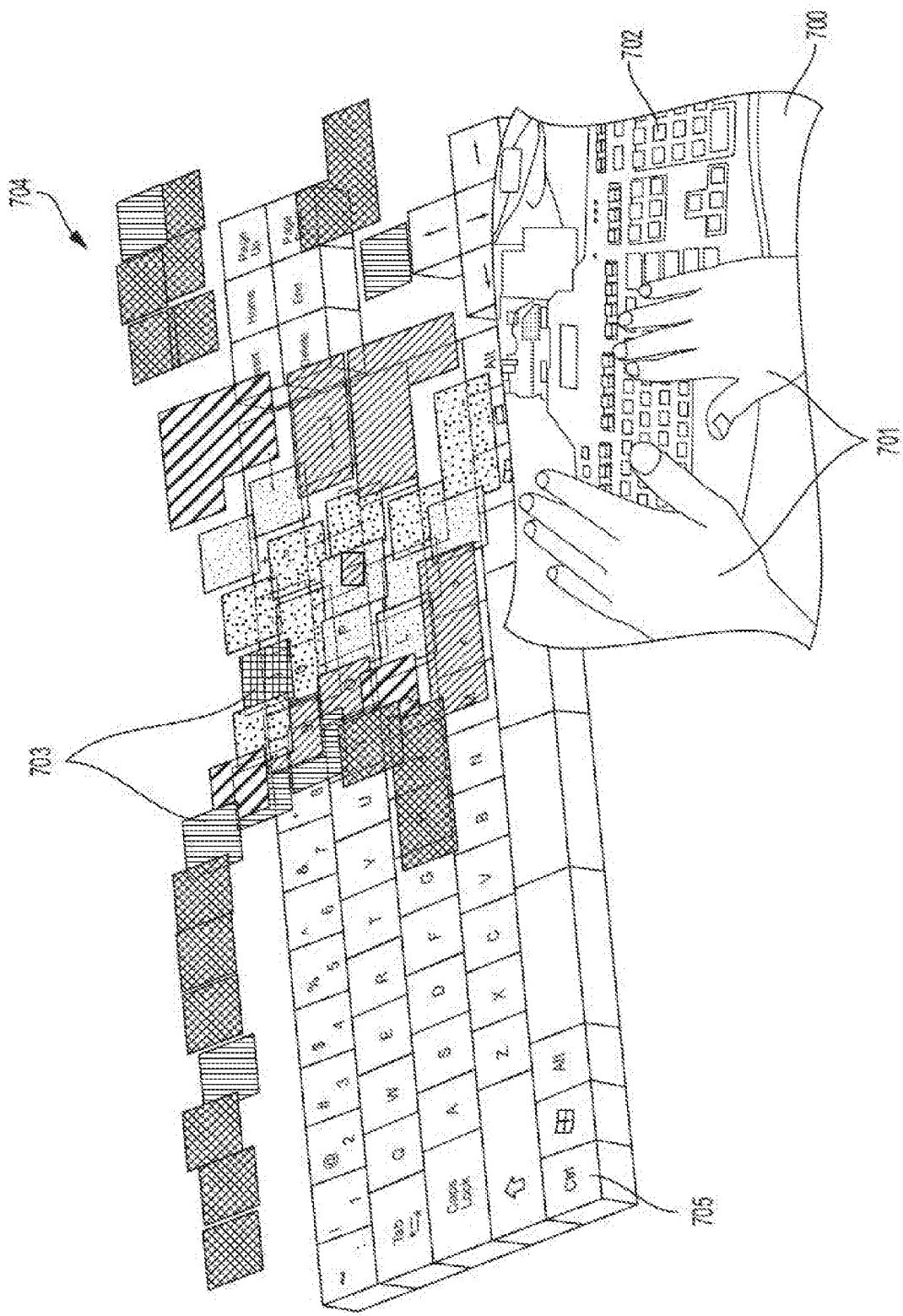
FIG. 7 shows an exemplary keyboard with a user's hands positioned in proximity thereto, and an illustration of that keyboard with a computer-generated heat map superimposed on the illustrated keyboard to correspond to the positioning and proximity of the user's hands with the exemplary keyboard.
Figure 8:
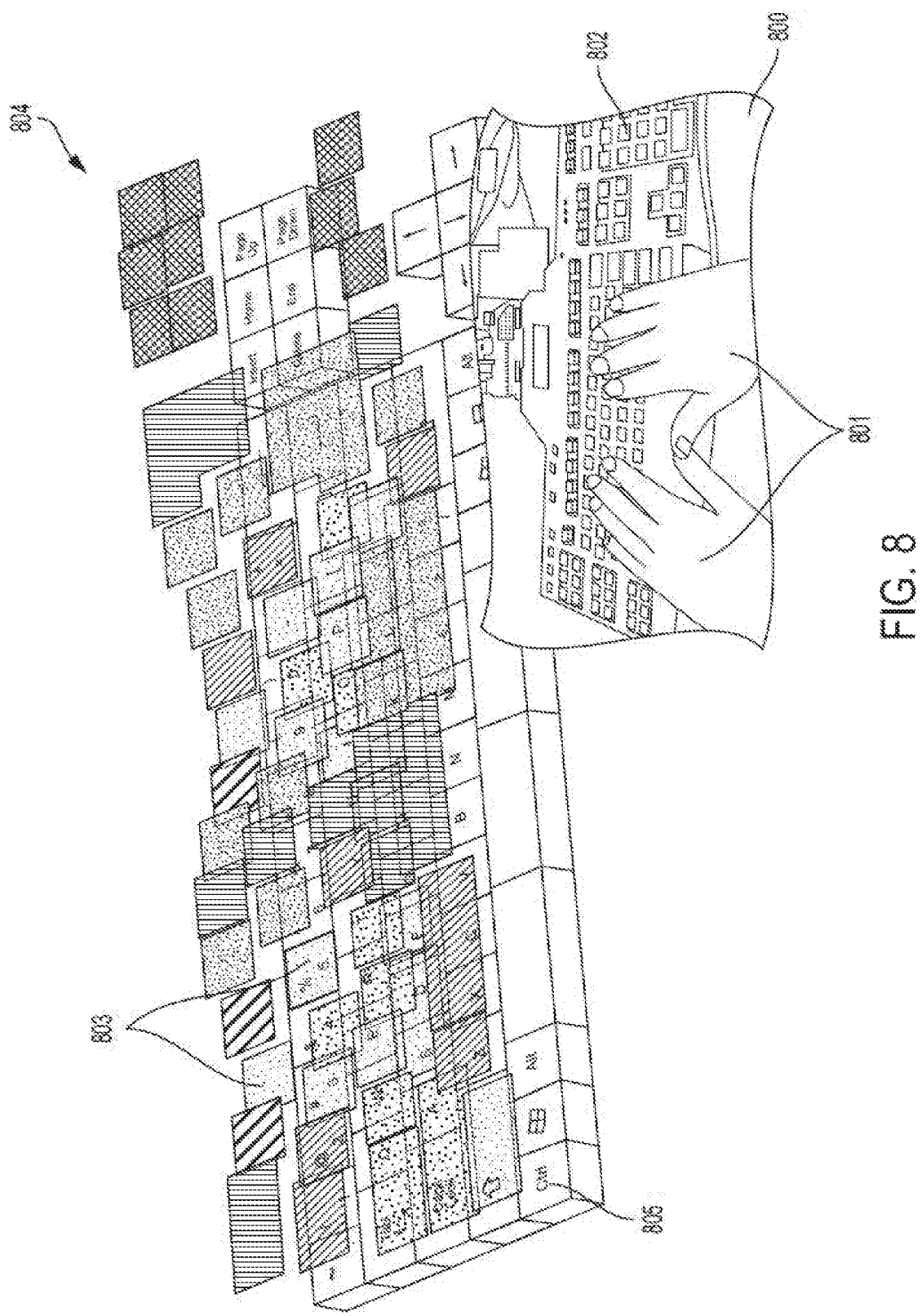
FIG. 8 shows another view of the exemplary keyboard with a user's hands repositioned in proximity thereto, and an illustration of that keyboard having an illustration of a computer-generated heat map superimposed thereon.

Turning now to FIGS. 7 and 8 which show an illustrative example of computer-generated touch state information displayed above a depiction of a touch sensitive keyboard according to the present disclosure. The inset pictures 700, 800 in FIGS. 7 and 8 show the position of hands 701, 801 with respect to an exemplary physical keyboard 702, 802. Both height above the keyboard illustration and color 703, 803 are used to for the purposes of the touch state illustration. The heights and colors shown are merely illustrative. As illustrated in FIGS. 7 and 8, an embodiment of the physical keyboard 702, 802 disclosed herein may be used to provide information concerning the touch state of each keyboard switch, which, as illustrated, can provide a visual display 704, 804 of hover, key contact and key depress. Specifically, FIG. 7 shows an exemplary keyboard 702 according to the disclosure, with a user's hands 701 positioned in proximity thereto and an illustration of that keyboard 705 with a computer-generated heat map 703 superimposed thereon. The computer-generated heat map 703 corresponds to the touch states of the various keyboard switches, and thus, is intended to correspond to the positioning and proximity of the user's hands with the exemplary keyboard 702. FIG. 8 shows another view of the exemplary keyboard 802 with the user's hands 801 repositioned from FIG. 7, and an illustration of that keyboard 805 having a computer-generated heat map 803 superimposed thereon.

In an embodiment, a reconstruction of the hover, contact and pressure information may be configured to display as a 3-D model, allowing a user to see his or her fingers, and potentially hands, wrists and/or forearms relative to the keyboard in a VR/AR view. In an embodiment, the range of touch states corresponding to hover extend at least 5 mm from the surface of the keyboard switches. In an embodiment, the range of touch states corresponding to hover extend at least 10 mm from the surface of the keyboard switches. In an embodiment, the range of touch states corresponding to hover extend substantially more than 10 mm from the surface of the keyboard switches.

In an embodiment, on-the-fly tuning may be done to permit extended hover while maintaining a contact-sensitive keyboard. In an embodiment, different orthogonal signals are used in a non-hover state, and hover state from the signals used in the range of contact states; or in a far-hover state versus a near-hover state. In an embodiment, different physical antennae are used to transmit and receive signals in a non-hover state, and hover state from the antennae used in the range of contact states; or in a far-hover state versus a near-hover state.

U.S. patent application Ser. No. 15/162,240, filed May 23, 2016, entitled "Transmitting and Receiving System and Method for Bidirectional Orthogonal Signaling Sensors," the entire disclosure of which is incorporated herein by reference, provides user, hand and object discrimination in a fast multi-touch sensor. In an embodiment, bidirectional orthogonal signaling is used in connection with a touch sensitive keyboard to provide the benefits as explained in that application. Where bidirectional orthogonal signaling is used, each of the antennae may be used as both receive and transmit antennae.

The entire disclosure of U.S. patent application Ser. No. 14/466,624, filed Aug. 22, 2014, entitled "Orthogonal Signaling Touch User, Hand and Object Discrimination Systems and Methods," is incorporated herein by reference. In an embodiment, the keyboard or keyboard switch disclosed herein can distinguish between the hands and fingers of multiple users, different hands of the same user, different fingers of the same user, and hands and objects.

Figure 9:
FIG. 9 is an illustration showing a hybrid of a user's view and real-world view of a featured keyboard.

FIG. 9 shows a hybrid view partially representing a user's VR/AR view and partially representing a real-world view of a featured keyboard. In VR/AR settings, in an embodiment, each interactive key on the keyboard can become an independent, interactive touch display. Allowing the keyboard to adapt more flexibility to software defined or related tasks, and providing dynamic visual feedback to the user while using the keyboard. In an embodiment, 3-D modeling can be employed using the touch state information from the disclosed touch sensitive keyboard to provide a user with a view of his or her fingers, hands, wrists, forearms, and even the keyboard in VR/AR settings. In an embodiment, the touch state information may be used in connection with prediction of user's actions, and such predictions can be used to mitigate or eliminate latency.

Figure 10:
FIG. 10 is an illustration showing a hybrid of a user's view and real-world view of a feature-sparse keyboard.

FIG. 10 shows a hybrid view partially representing a user's VR/AR view and partially representing a real-world view of a feature-sparse keyboard. As used herein, the term feature-sparse keyboard includes surfaces without specific physical keys having a generally fixed key-spacing. For example, an iPad or mobile phone keyboard can be considered a feature-sparse keyboard. However, the term feature-sparse keyboard also includes keyboards that include some physical features, and may include haptic feedback to present keys or other features of a keyboard. Such haptics may include, without limitation, moving mechanical parts, robotic graphics, electrostatic feedback and/or electroshock feedback. In VR/AR settings, in an embodiment, feature-sparse and/or haptic keyboard can become an independent, interactive touch display. In VR/AR settings, through techniques known in the art, a feature-sparse haptic keyboard may tactually seem to have keys and may provide dynamic physical feedback to the user while using the keyboard in this setting. In VR/AR settings, through techniques known in the art, the feature-sparse and/or haptic keyboard may visually appear to have keys and/or labels and may provide dynamic physical feedback to the user while using the keyboard in this setting. Thus, even though the user sees limited features or no features at all in a real-world setting, key outlines and labels can be added in the VR/AR setting.

Figure 11:
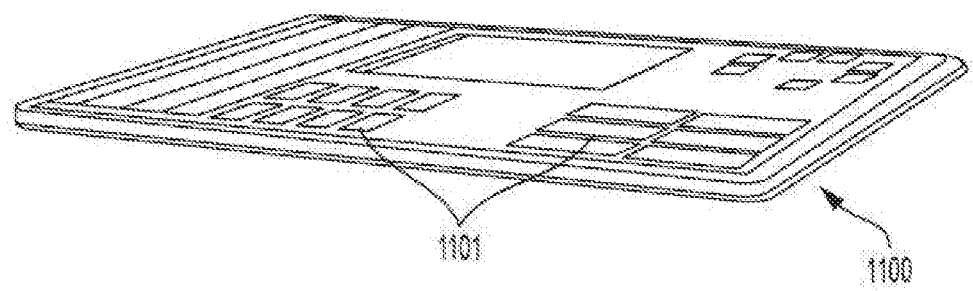
FIG. 11 shows an exemplary embodiment of a featured keyboard.
Figure 12A:
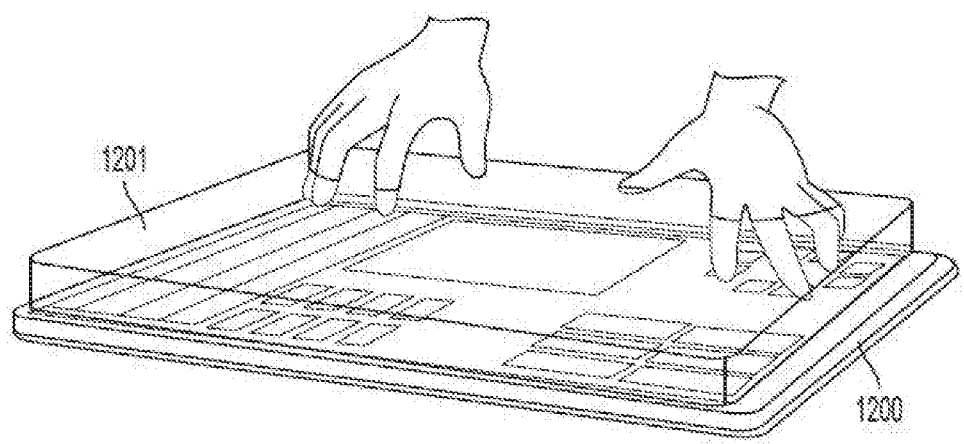
FIG. 12A shows an illustrative sensor range of a featured keyboard.
Figure 12B:
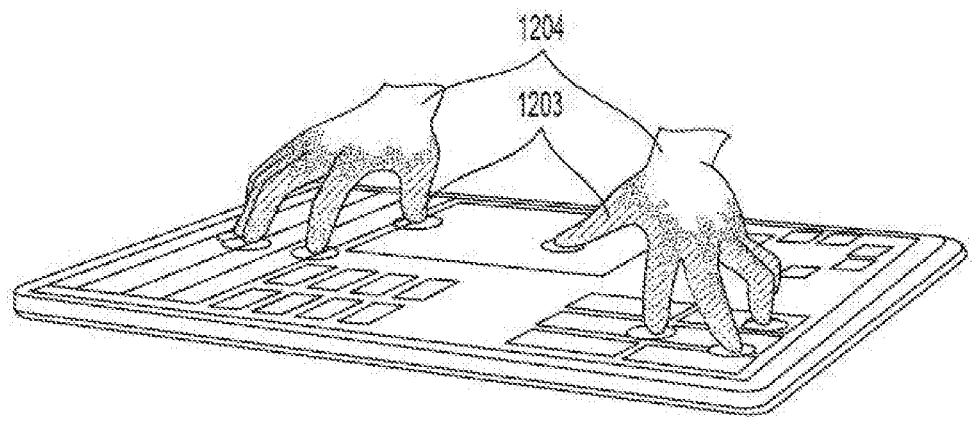
FIG. 12B shows an example of a heat map of the user's fingers and hands within the sensor range on a featured keyboard.

FIGS. 11 and 12A-12C depict several embodiments that can be used with the methods and apparatus disclosed herein. FIG. 11 illustrates an exemplary embodiment of a keyboard 1100 having physical features 1101 in the real-world setting. In an embodiment, and as described above, the keyboard may be a feature-sparse and/or haptic keyboard used in a VR/AR setting. FIG. 12A shows an example of the touch sensor range 1201 of a featured keyboard 1200 being used. While the sensor range 1201 is depicted, that depiction is just for illustrative purposes. In an embodiment, the keyboard 1200 may be a feature-sparse and/or haptic keyboard used in a VR/AR setting. In an embodiment, the sensor range 1201 of the touch sensor corresponds to the touch sensitivity of the keyboard switches on the keyboard 1200. FIG. 12B shows an example of a heat map 1203 of information within touch sensor range of the user's fingers and hands, and the extrapolation from the heat map 1203 of the user's wrists 1204.

Figure 12C:
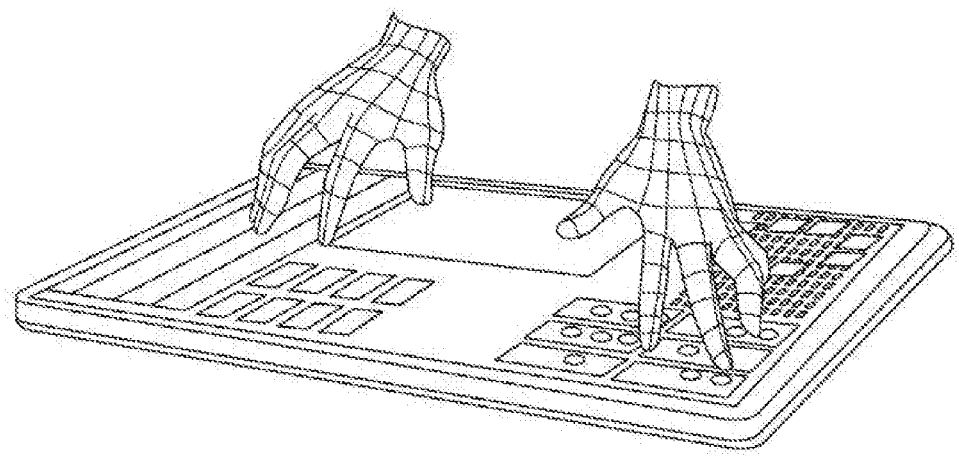
FIG. 12C shows an example of a user's fingers, hands, and wrists, and visual context, being recreated on a keyboard in virtual or augmented reality.

FIG. 12C shows an embodiment of a VR/AR world view of the same user's fingers, hands and wrists and a visual context as may be reconstructed for use in connection with keyboard in a VR/AR setting. In an embodiment, the touch state information can be used to reconstruct the user's fingers, hands and wrists in 3-D in VR/AR settings with low latency. The low latency may permit an VR/AR system to provide 3-D haptics, thus, providing the user with physical buttons and controllers on a real-world keyboard that mirrors software defined buttons and controls of a VR/AR keyboard. For example, in an embodiment, 3-D haptics may create physical input surfaces that can flexibly deform their physical controls to match the VR/AR digital controls of a given VR/AR application. In an embodiment, haptics may cause a user to perceive physical input surfaces to match the VR/AR digital controls of a given VR/AR application. In an embodiment, physical or haptic interfaces are provided that can be fit to their intended use and that mirror their digital equivalents in VR/AR settings.

Because contact is not required, in an embodiment, touch state information may be used as an input to a gesture interpretation algorithm. Thus, a location at a distance above the keyboard could be turned into a zone where a user could gesture. Such a zone may be modal, and itself activated by a gesture, contact or key press or combination of gestures, contact or key presses. In an embodiment, the hand can be used as a computer mouse, making the familiar movements without removal of the hand from proximity with the keyboard. In an embodiment, "cupping" the hand into a mouse-like shape will automatically cause further gestures from that hand to be interpreted as mouse gestures—including, e.g., button clicks, wheel rotation and movement. In an embodiment, a tapping motion in the air can be interpreted as a gesture, and may result in a system response. In an embodiment, the surface of a key or a subset of keys could act as a track pad when the user skims or makes some other type of gesture with his or her fingers or hand on them.

Figure 13:
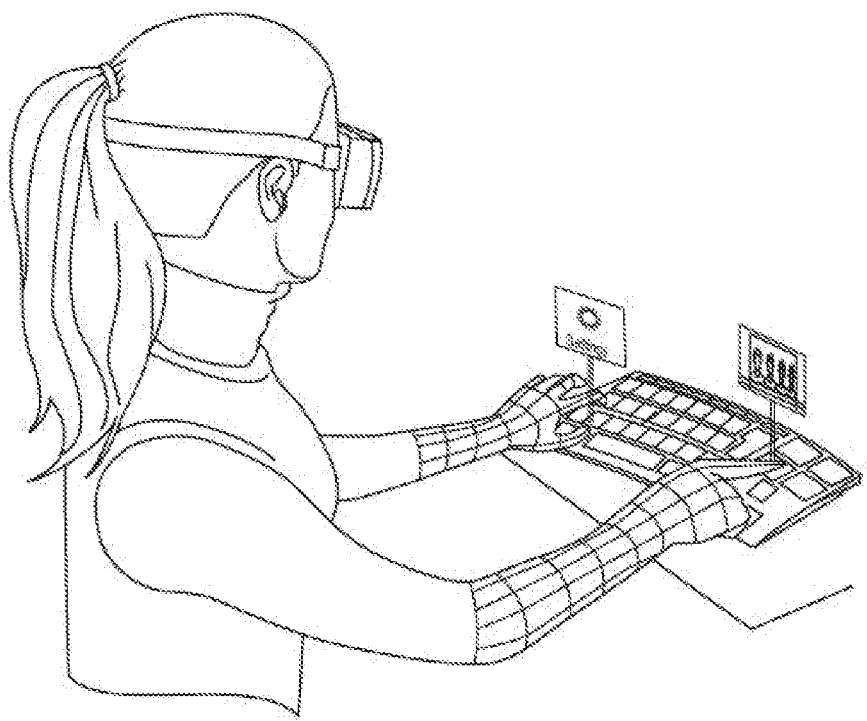
FIG. 13 is an illustration showing a hybrid of a user's view and real-world view of a keyboard displaying floating tool-tips in the user's virtual or augmented reality view.

The touch state information provided by the novel keyboard switches and keyboard presented herein allows application and operating system software to have information from which resting on, or hovering over a physical key (or VR/AR key) can be identified. Turning to FIG. 13, an exemplary implementation of tool-tipping is shown. FIG. 13 provides an exemplary illustration of a hybrid view of a user's view and real-world view of the keyboard offering the user a floating tool-tip to, for example, assist in learning keyboard shortcuts for a given application or operating system since the keyboard can either sense a user resting on or hovering above the keys or predict the user's next key press(es) before the user makes contact with the keys. In an embodiment, the touch state information is used to determine particular positions or combinations of positions where a tool-tip or other feedback is desirable, and such tool-tip or other feedback can be presented in the VR/AR representation. Similarly, additional display space may be desirable in the form of a balloon, such that, for example, where a user hovers over or contacts a keyboard switch (or combination) a balloon may be displayed, such as, the "next song" that may play if a "next" key is pressed. In an illustrative embodiment, the disclosed keyboard enables a VR/AR user interface mapped to a physical input surface, which includes but is not limited to a keyboard. In doing so, each key on the keyboard can be a multi-touch, gestural display since each key on the physical keyboard can become a visual screen in a VR/AR setting. For example, the VR/AR user interface elements can be mapped to physical keyboard input controls as interactive 2-D icons, images and text (e.g., a volume button control that shows the current volume-level, etc.) and even as 3-D icons, images and text (e.g., a play button that appears when the user rests his or her finger on the associated physical key thereby creating a 3-D tool-tip along the z-axis that shows the user what album will be played via the display of album-art imagery, etc.).

Keyboard Interactions

Below are discussed new forms of touch, in-air, and hybrid touch/in-air keyboard user input interactions. In an embodiment, the new forms of touch, in-air, and hybrid touch/in-air keyboard user input interactions may be enabled or enhanced by one or more of the novel devices disclosed in the above-identified co-pending applications. In an embodiment, the disclosed forms of interaction can be included as features in a dedicated device or be included in a software developer kit (SDK) proposing specific APIs enabling one or more of the embodiments described herein.

Inclusion in an SDK enables OS manufacturers, OEMs, application developers, and users to develop, build or interface with Touch Sensitive devices based common or standard interfaces, and to support some or all of the gestural mechanics, including those described herein, as may be desired. In various embodiments, the novel interaction techniques may be implemented on or for use in connection with a variety of objects, including, without limitation: keyboards that include multiple physical keycaps; keyboards that include but are not limited to a single physical keycap (e.g. a button); keyboards that include other physical controls, including but not limited to switches, sliders, and dials; keyboards that include virtual controls including but not limited to virtual keycaps, buttons, switches, sliders, and dials simulated by haptic techniques including but not limited to electro-statics, electro-shock, and vibro-tactile feedback; keyboards that include just-in-time or reshapable physical controls including but not limited to physical keycaps, buttons, switches, sliders, and dials whose shape can be formed or altered through computer-controlled physical deformation techniques including but not limited to micro-electro-mechanical robotics and electrically active polymers; touch and hover pads; and other touch-sensitive physical objects, including game controllers, steering wheels, sporting goods grips and balls.

Throughout this disclosure, the terms like "touch sensitive keyboard," "touch pad," "hover pad" and "touch sensitive device" are used interchangeably to refer to a category of touch-sensitive devices that can sense both contact and varying degrees of hover. Such touch sensitive device are described and disclosed in co-pending applications U.S. patent application Ser. No. 15/200,642, entitled TOUCH SENSITIVE KEYBOARD, filed Jul. 1, 2016; U.S. patent application Ser. No. 15/221,391; U.S. patent application Ser. No. 15/224,226, entitled HOVER-SENSITIVE TOUCH-PAD, filed Jul. 29, 2016; and U.S. patent application Ser. No. 15/251,859, entitled TOUCH-SENSITIVE OBJECTS, filed Aug. 30, 2016. Familiarity with those disclosure and the terminology therein is presume.

Single-Handed Swiping Gesture.

In an embodiment, on a Touch sensitive keyboard device, a single hand moving from left-to-right across the keyboard, from right-to-left across the keyboard, from the top-to-bottom, or from bottom-to-top either in-air or while in contact with the keys of the keyboard can be recognized as an input gesture made by the user. In embodiment, in a plane roughly perpendicular to the plane of the keys, a hand movement upwards away from or down toward the keyboard's surfaces can also be recognized.

In an embodiment, paths in 3D space defined by tracked points or objects may be mapped to responses, using known techniques for recognizing movement, such as but not limited to template matching or heuristic approaches. In an embodiment, the tracked points may be arbitrary points, such as the one or more associated with fingertips. In an embodiment, the tracked points may be the arrangement of points, such as the relative separation of the fingertip and the palm to detect "curling" of the finger. The particular recognition algorithm used is unimportant. The algorithms, systems and methods disclosed herein are at a higher level than the recognition algorithm; as an example, in an embodiment, the algorithms, systems and methods describe the actions taken by a system in response to the recognition of a gesture, rather than the recognition itself.

Once a gesture is recognized, myriad responses are possible from the system. In an embodiment, such responses may be classified into two categories, namely: continuous actions (e.g., actions which generate a continuous (or multiple) response from the system); and discrete actions (e.g., actions which generate a discrete response). In an embodiment, the same physical gesture might be mapped to both such categories. As an example, swiping a hand from left-to-right in a plane roughly parallel to and above the keyboard might trigger a discrete application switch, or might trigger a continuous response whereby the system continuously gives feedback, such as mapping the translation of an on-screen object to the movement of the hand. Any action that can be performed by the system, or initiated by the system, can be associated with the recognition of one gesture or more than one gesture. Moreover, gestures may be simple, as in the movement of a finger or hand, more complex, such as the movement of several or all of the fingers on a hand (e.g., to make a shape with a hand), or could require more than one hand (e.g., movement of two hands, movement of a stylus within a hand). Other examples of actions taken in response to the recognition of a gesture include, but are not limited to: discrete action such as close current application, lock computer, switch to next application in a list, forward or back 1-page in a document, back in a web-browser, swipe-to-move and swipe-to-close/archive like interaction, play/pause media, window management commands, start or end communications session; and (b) continuous inputs, such as adjust volume, adjust brightness, navigate through a video/audio scrub-wheel, navigate a camera, zoom, scroll, and move pointer (e.g., mouse pointer). It will be apparent to one of skill in the art, in view of this disclosure, that one or more particular gestures may be mapped to one or more specific system responses, and that the one or more specific system responses may be of a continuous or discrete type, all of which are within the scope and spirit of this disclosure.

Two-handed Gestures.

Two hands operating in the space above a Touch sensitive device may allow for additional fidelity. Sensing and recognition techniques applied to the detection of such gestures are interchangeable; for example, tracking two points on the same hand vs. one point on each of two hands is not functionally distinct at the level of detection algorithm selection. In terms of gestures which may be detected: two hands may for example move in concert (e.g. two hands moving from left-to-right across a Touch sensitive device) or may for example move counter to one another (e.g. two hands moving apart or together over the keyboard). Two hands may also move while simultaneously moving parts of the hands. In an embodiment, the language of gestures is across all, or substantially all of the dexterity of the hand.

In an embodiment, the recognized gestures distinguish among several hand postures which may occur in a plane roughly parallel to that of the keyboard. These include but are not limited to: two-hands moving left together; two-hands moving right together; two-hands moving forward together; two-hands moving backward together; two-hands coming together; two-hands moving apart; one hand moving forward while the other moves backward; and one-hand remaining stationary while the other hand moves left and right or forward and backward. In an embodiment, the touch sensitive device can distinguish among the following vertical motions: two hands moving up; two hands moving down; one hand moving up or down while the other hand moves the opposite direction; and one hand moving up or down while the other hand remains (vertically) stationary. In an embodiment, the Touch sensitive device can report all recognized gestures to the host operating system or other computational device which may be configured to act upon their occurrence. In an embodiment, the Touch sensitive device can report a subset of the recognized gestures to the host operating system or other computational device which may be configured to act upon their occurrence.

Dialing Gesture.

In addition to point-based input and multi-point input performed with the Touch sensitive device, in an embodiment, touches made on the key surfaces or movements made above the keys are interpreted as dialing gestures. Dialing gestures may provide a natural means of continuous input. In an embodiment, for example, turning the fingers or other objects above the keyboard in a counterclockwise fashion might scroll up, or scroll down. The dialing gesture does not have a natural extent (that is, unlike, say, joint movement, it does not have a maximum or minimum position). Accordingly, in an embodiment, a dialing gesture may be employed for the scrolling of documents, including very long documents. In an embodiment, arbitrary control/display gain functions are provided so that dialing may produce more or less effect on the dialed object.

Virtual Steering Wheel.

Interactions which are constrained by physical controls provide limited degrees of freedom, and are known to enable further precision because the user is able to focus on a reduced interaction space. As an example, turning a car with a steering wheel is simpler than simultaneously controlling direction and fuel flow with a joystick. Thus, in an embodiment, the movements of the hands are mapped to virtual physical objects, the manipulation of which provides a control signal. In an embodiment, a user might be presented with a digital image of a steering wheel via a 2D monitor or head-mounted VR or AR display, which they can turn to give input to a driving simulator; the movement of the hands in 3D space can be mapped to the movement of the wheel as if the user were holding it. In an embodiment, the movement of the hands in 3D space can be mapped to non-traditional movement of the wheel (e.g., faster or slower), thus, using this technique, control can be done in a manner that may not be possible if the user were holding the wheel.

Discerning Non-Hand Objects.

In addition to recognizing one or two hands near the keyboard, in an embodiment a touch sensitive device can sense when the hand is grasping a physical object. Examples include, without limitation, when a single hand holds a mobile device above the keyboard, or when two hands grip a physical steering wheel control. In an embodiment, the electric sensing field created above a touch sensitive device can detect a 3D marker or set of markers on or beneath the surface of a physical object to help input processing algorithms identify a physical object being grasped by a user or users above a touch sensitive device. In an embodiment, the shape or category of a physical object held above a touch sensitive device can be inferred by a Touch sensitive device by analyzing the 3D hand and grip pose of the user or users holding the physical object. In an embodiment, a physical object proximate to a touch sensitive device in 3D space could communicate its identity, category, and 3D position to a touch sensitive device via known frequency- or code-division modulation signals detected by a touch sensitive device or via discrete radio-frequency communication channels such as but not limited to near-field communication, WiFi, and bluetooth.

Multimodal Interaction.

In an embodiment, in addition to recognizing one or two hands near the touch sensitive device, the combination of hand and device input are used for gesturing. In an embodiment, combination of hand and device input are used when (i) selecting a target on a computer display using a mouse or touch sensitive screen, and then (ii) modifying the selected target with a hand gesture. In an embodiment, a user selects a point of interest on a map application using a mouse and then zooms out the map view by moving the hand up and away from the keyboard. In an embodiment, a touch sensitive device segments its raw sensing data into multiple input streams with discrete filtering, processing, post-processing, and application program interfaces tailored to a given input stream such as but not limited to sensed 2D hand model(s), 3D hand model(s), 2D finger model(s), 3D finger model(s), 2D fingertip locations above a Touch sensitive device's surface, 3D fingertip locations above a Touch sensitive device's surface, multi-finger gestures occurring in 2D/3D planes parallel to and above the Keyboard's surface, hand identification, and user identification.

Describing Shaped Surfaces.

In an embodiment, the touch sensitive device or api senses hands and hover gestures in a volume, and uses their position and shape to describe surface geometry. In an embodiment, this facilitates description of three-dimensional surfaces, especially those with complex geometry, using a planar pointing device (i.e. mouse or trackpad). In an embodiment, a three-dimensional NURBS (non-uniform ration basis spline) surface may be defined by moving one or more hands over an imaginary surface. In an embodiment, principal curvatures or contour lines may be traced in a volume to define a 3D surface. In an embodiment, gestures can be used to instigate 3D modelling functions, including, but not limited to: extrusions, sweeps, revolutions, push/pull operations and sculpting. In an embodiment, gestures in a volume can be used to instigate 3D modelling functions. In an embodiment, one handed gestures can be used to instigate 3D modelling functions. In an embodiment, two handed gestures can be used to instigate 3D modelling functions.

Redirecting Input.

It may be difficult to type on mobile devices such as phones or in particular on small mobile devices based on small screens as smartwatches. In an embodiment, recognized gestures or inputs to a touch sensitive device are redirected, e.g., as keyboard input to a mobile device when the mobile device is placed in a volume in proximity to a touch sensitive device. In an embodiment, a user could hold an arm wearing a smartwatch in the volume above the touch sensitive device or keyboard. In an embodiment, a user could place a mobile phone in the volume above the touch sensitive device or keyboard. In either case, the user can use the other hand (or if the device is resting, both hands) to interact with the touch sensitive device (e.g., type on the keyboard), and the interactions may be redirected to the mobile device, e.g., a smartwatch or mobile phone. In an embodiment, placing the device (e.g., smartwatch or mobile phone) in a specific volume associated with the touch sensitive device indicates that the device should receive keyboard input from the touch sensitive device. In an embodiment, the touch sensitive device or keyboard outputs keyboard data to the device. In an embodiment, information corresponding to the interaction with the touch sensitive device will appear automatically on the screen of the respective device. In an embodiment, information corresponding to typing on a touch sensitive keyboard will appear automatically on the screen of a mobile device placed in proximity to a volume associated with the touch sensitive keyboard.

Preemptive Sensing on Vertical Surfaces.

On a traditional laptop display, hover information is limited and cannot sense the distant location of a fingertip.

Using a Touch sensitive device positioned beneath a vertical display (e.g. laptop display), it is possible to sense how fingers approach and contact a screen, e.g., a laptop screen. In an embodiment, a display that is not touch sensitive is used in combination with the Touch sensitive device to enable touch ability on that display. In an embodiment, an existing laptop display with touch capability is used in combination with a Touch sensitive device to complement the existing display 2D touch information with vertical hover data from the keyboard. In an embodiment, combining a Touch sensitive device to complement the existing display 2D touch information with vertical hover data (e.g., from a touch sensitive keyboard) can enable 3D sensing from the display. In an embodiment, a subset of such Touch sensitive device/display combined input information is provided to applications. In an embodiment, hover input from a touch sensitive keyboard can be used to indicate when a finger approaches a screen. In an embodiment, hover input from a touch sensitive keyboard indicating a finger approaching the screen is used a wake the display's touch sensor, e.g., from a deep sleep. In an embodiment, the trajectory of a finger is calculated, before it contacts the screen, and is used to ready the user interface and improve target selection accuracy.

Transitions Between States.

In embodiments of the present invention the distance of the user's body (finger, hand, etc.) from the touch sensitive keyboard may be presented to application or other software as a continuous variable (e.g., a value of "z"). In an embodiment, this distance may be discretized into what might be termed "states", and utilized to determine entry, presence, and/or exiting to and/or from such states. In an embodiment, such "states" are used as part of the method for providing (e.g., initiating) a response. In an embodiment, hover information may be discretized into a "hovering" state and the "typing" state, or "resting on keys" state. In an embodiment, discretized information is used to trigger actions that make sense when the user is in the associated state, e.g., ready to start typing. In an embodiment, the states might include other discretizations, such as "hovering far" and "hovering near". In an embodiment, more states are used. In an embodiment, the states may include sub-states. In an embodiment, the "hovering" state includes sub-states. In an embodiment, the "hovering" state includes at least two sub-states, such as "hovering far" and "hovering near".

In an embodiment, a hover state is used to turn on a "sleeping" display. In an embodiment, a locked computer that has not been used for a significant time turns on the display on "hover". In an embodiment, instead of using the mouse cursor to focus on the password field, a transition between "hover" into "resting on keys" can focus on the right field. Furthermore, the way the user approaches the keyboard (and creates the transition) can be used to identify the user and provide a quick way to unlock the computer, (e.g., with the right username and password or based on another biometric). The reverse can also be applied. In an embodiment, a workstation may be locked when no hover (or key interaction) at all is detected for a period of time. Thus, in an embodiment, a lock screen countdown starts if—and only if—there are not hands near the keyboard.

As another example, in an embodiment, a system practicing the present invention might designate the transition between such states as a "gesture", where moving the hand from "hovering near" to "hovering far" might cause manipulation or movements to be applied to the window of the current application, rather than to its content. This allows the user to perform the same movement (sliding their hand laterally across the top of the keyboard area) to manipulate different content.

Finger Tracking.

When typing, some fingers, in particular thumbs, have some liberty of movement. Thumbs are rarely used on anything other than spacebars. However, thumb islands with multiple buttons may increase productivity. Hover sensing could be used to sense gestures of the thumb, such as for example: overload the space bar given the thumb approach; have the thumbs hover movement identified as a gesture that changes text formatting such as italic and/or bold; and/or horizontal movement identified on the "hover" state could trigger undo or delete actions. In an embodiment, thumb sensing can be employed to instigate changes without the need to lift the whole hand off the keyboard. In an embodiment, finger tracking poses of unused finger while typing can be used to associated emoticons automatically labelling the text being type. This is very useful to increase the expressivity of text based conversations, allowing a fast and extensive access to a set of predefined labels that will complement the text being shared. This can also be applied when typing a document and add additional information as labels or footnotes.

Open/Closed Hand Selection Action for Hover.

Hands in "hover" state present different signatures based on whenever the hand is closed or open. In an embodiment, this information can be used to trigger a select action without leaving hover. In an embodiment, this behavior can be used to, for example, use horizontal movement to "alt-tab" into a specific window and "grab" the window to visually drag it to a left-half or right-half maximization. When using a Touch sensitive device with a trackpad on a laptop, in an embodiment, "drag" can be control by one hand using the trackpad and the begin and end of the selection can be identified by opening or closing the other hand if located in a volume detected by the Touch sensitive device. More generally, detecting the opening or closing of a hand, or the making of a shape with a hand, can be used to interpret other interactions, such as the interactions of a stylus (e.g., ink color, or line thickness or eraser versus pen), the interactions of another hand's gesture (e.g., scrolling faster or slower), the interactions of another hand on the keyboard, or otherwise. In an embodiment, detecting the opening or closing of a hand may be used to interpret actions with that hand, such as, for example, putting a hand in the shape it would be if on a mouse could interpret movement of that hand as the movement of a mouse.

Key Pressed, Freehand Multi-Modal Input.

More esoteric states can be achieved by multi-key shortcuts. In an embodiment, for example, zoom is controlled, control + and control − are often multi-key combinations used to incrementally zoom in on webpage. In an embodiment, the "hover" state can have different meaning based on what keys are pressed down. Thus, for example, in an embodiment, while a specific key (e.g., the Z key) is pressed the "hover" information can be interpreted as a continuous (relative or absolute) zoom. In another example, pressing "space" causes "hover" information to be interpreted as a pan action on google maps.

Text Correction Based on Finger Motion Utilizing Hover Information.

The introduction of "hover" can provide the full finger transition from key to key. In an embodiment, this information can be used to identify multiple-letter typos that start because the user wrongly positioned their hand and typed a sequence of wrong letters. As an example, if instead of typing tomorrow, the user types tonirriw, it may indicate that the right hand was not positioned properly starting with the first "o". In an embodiment, once this kind of typo is identified, the "hover" information can be used to properly correct the remaining key-presses. In an embodiment, once this kind of typo is identified, the "hover" information can be used to add extra information to be used in spell checking algorithms. Such an implementation could achieve spell checking in real-time that is based on both the "written language" but also the user typical hand position mistakes and provide correct typing even with bad hand positioning, thus potentially preemptively avoiding typos being visible on-screen.

Implications for Other Input Devices.

In some embodiments of the present invention, the touch sensitive keyboard may be surrounded by other input devices, such as move, the "hover" status can indicate a transition between typing and engaging with the mouse (by observing a right-hand horizontal movement leaving to the right of the keyboard). In an embodiment, this can provide cues to ramp up mouse sampling rate or to highlight mouse cursor just when the mouse is about to be used. In an embodiment, a trackpad built-into a device below the keyboard, such as on a laptop computer, is included; such trackpads are often the subject of accidental input, because the user's palm rests below the keyboard. In an embodiment, such accidental input is mitigated or avoided by turning off or otherwise ignoring trackpad input when the user's fingers are resting on the hover keyboard. In an embodiment, such accidental input is mitigated or avoided by turning off or otherwise ignoring trackpad input when the user's fingers are resting on the hover keyboard.

In an embodiment, a touch sensitive keyboard comprises a plurality of keys, wherein a plurality of the keys are each adapted to output a touch signal in response to a proximity of a finger; a touchpad area separate from the keys, the touchpad area being sensitive to a proximity; and a processor operatively connected to the plurality of keys such that it can receive touch signals output thereby, and configured to disable the touchpad sensitivity to touch when at least one touch signals is received. In an embodiment, the processor is configured to disable the touchpad sensitivity to touch when a preconfigured group of touch signals is received. In an embodiment, the processor is configured to not disable the touchpad sensitivity to touch in response to touch signals from a set of preconfigured keys. In an embodiment, a plurality of the keys does not include a pre-selected group of keys. In an embodiment, the pre-selected group of keys includes at least one selected from the group comprising: control, shift, and alt. In an embodiment, the pre-selected group of keys includes at least one selected from the group comprising: control, shift, alt, function keys, caps lock, tab, enter, insert, delete home, end, pgup, pgdn, arrow keys, prtscn, scrlk, pause. In an embodiment, the pre-selected group of keys includes all of the non-character keys.

Figure 15A:
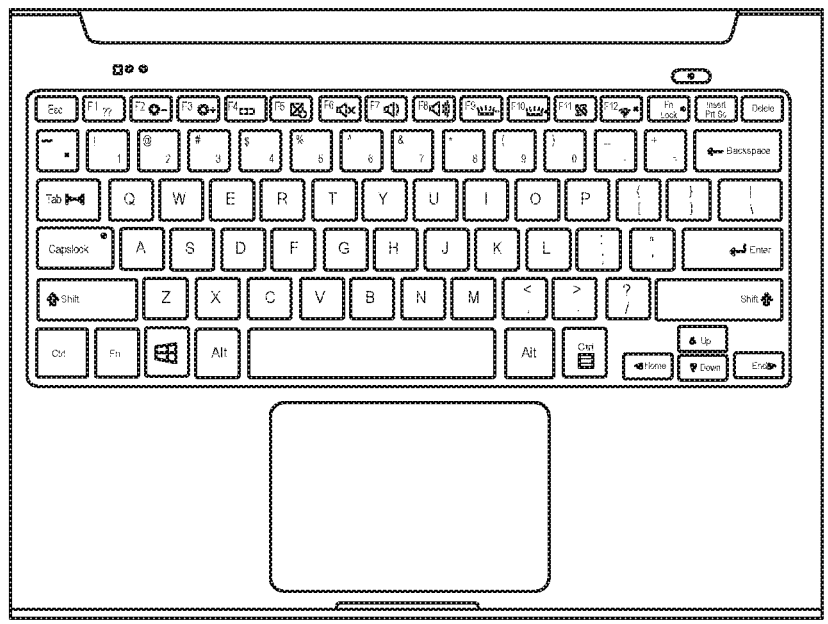
FIG. 15A shows a device with separate keyboard and touchpad.
Figure 15B:
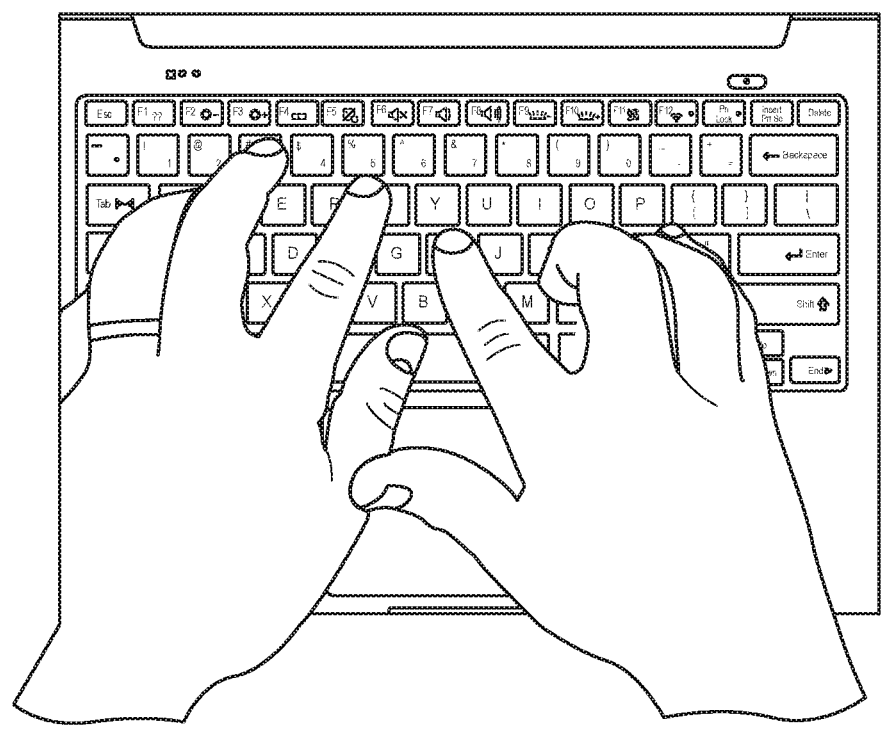
FIG. 15B shows the device's keyboard being used, with the touchpad disabled to prevent accidental input.
Figure 15C:
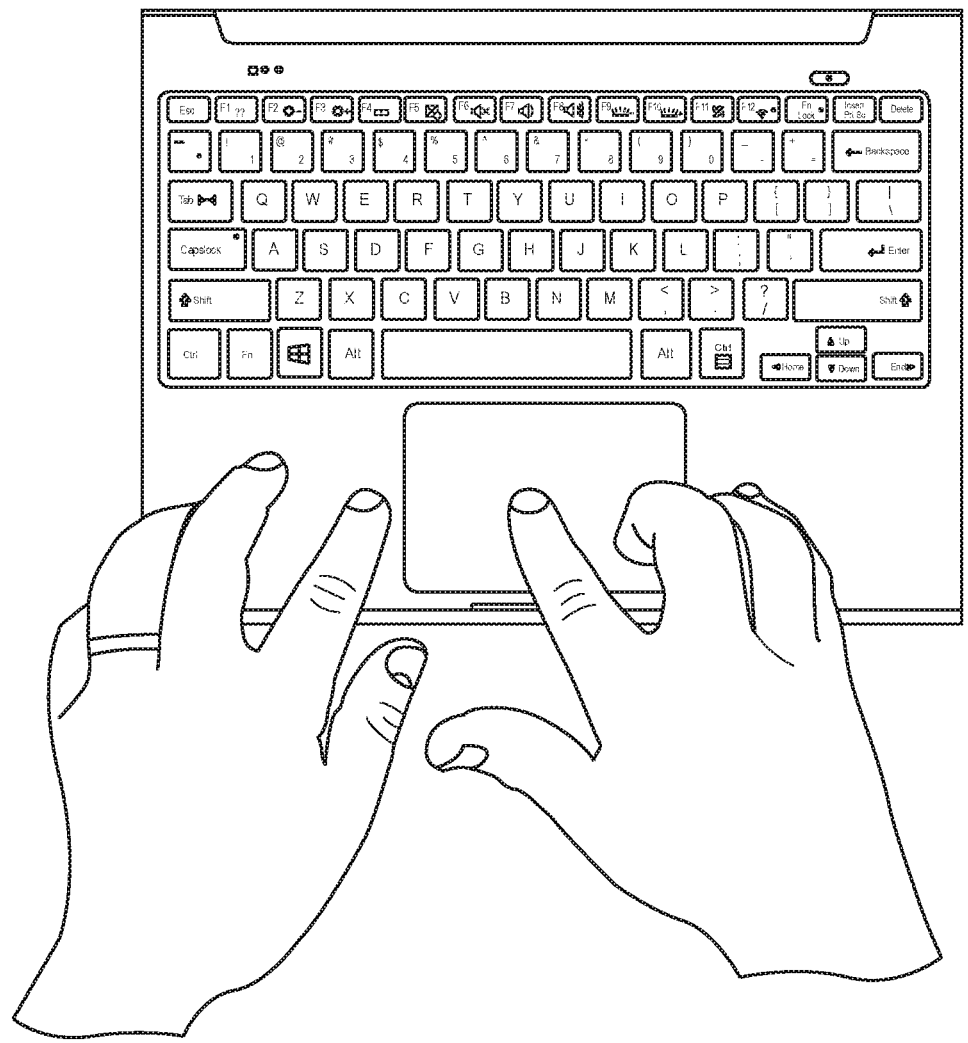
FIG. 15C shows the device's touchpad being used when the hand/fingers of the user are distant from the keys of the touch sensitive keyboard.

For illustration, FIG. 15A shows a keyboard and separate touchpad as found on a typical laptop. In an embodiment, the touchpad is disabled when hands and/or fingers are detected on and/or above the touch sensitive keyboard. FIG. 15B shows a user using the keyboard, with the resulting disabling of the touchpad. When the hands and/or fingers are distant from the touch sensitive keyboard (FIG. 15C), the touchpad is enabled.

Key(s) as Isometric Joystick.

In an embodiment, a single key or collection of keys act as an isometric joystick. In an embodiment, the joystick direction is calculated by interpolating the signal strengths among neighboring keys on the keyboard. In an embodiment, a single key on the keyboard is designated as the "center" key, and the direction of the isometric joystick is determined by interpolating the signal strengths of this "center" key and its immediate neighbor keys.

One such use of this isometric joystick is as a pointing stick, an isometric joystick that controls a computer pointing device. Such physical pointing sticks are common on laptops and other portable computers because of their small size (see IBM/Lenovo TrackPoint, Dell Track Stick, and Samsung Pointing Stick, among many others). These physical pointing sticks all require additional hardware in addition to the machine's keyboard. Typically opposing pairs of strain gages measures the lateral force applied to the pointing stick by the user's finger. The isometric joystick disclosed herein alleviates the need for additional pointing hardware. In an embodiment, a set of key(s) may function as an isotonic joystick.

In an embodiment, a touch sensitive keyboard may be used as a joystick or other control. In an embodiment, a plurality of keys on the touch sensitive keyboard are employed, each of the keys being adapted to output a signal strength corresponding to a distance between that key and a finger operating as a control. In an embodiment, the method comprises the steps of: placing the touch sensitive keyboard into a control state based upon a predefined positioning of at least a portion of at least one finger with respect to the touch sensitive keyboard; determining a control direction by interpolating signal strength among a group of neighboring keys on the keyboard; and outputting the control direction to a host system for use in control. In an embodiment, the method also includes a step of: determining a control magnitude by interpolating signal strength among a group of neighboring keys on the keyboard; and outputting the control magnitude to a host system for use in control. In an embodiment, the predefined positioning is one selected from the group of: two fingers of one hand resting on a ctrl key and an alt key; and both thumbs resting on a space bar. In an embodiment, the predefined positioning is preselected to be ergonomically easy, but is unlikely to happen accidentally in normal keyboard use. In an embodiment, the group of neighboring keys comprises a center key and each adjacent key. In an embodiment, the group of neighboring keys comprises each key adjacent to a center key. In an embodiment, the group of neighboring keys comprises each key within a certain distance of a center key. The method can also comprise the step of establishing a baseline position of a finger operating as a control, and the step of determining a control direction can establish a delta from the baseline position. In an embodiment, the delta from baseline approach can be used to emulate a joystick or other control output. In an embodiment, the control direction and optionally its magnitude can be used to emulate a joystick or other control. In an embodiment, the control direction is selected from the group consisting of: up, down, left and right. In an embodiment, the touch sensitive keyboard remains in the control state for a period of time. In an embodiment, the touch sensitive keyboard remains in the control state until an occurrence of a second predefined positioning of at least a portion of at least one finger with respect to the touch sensitive keyboard. In an embodiment, the second predefined positioning is a home row position.

Figure 16A:
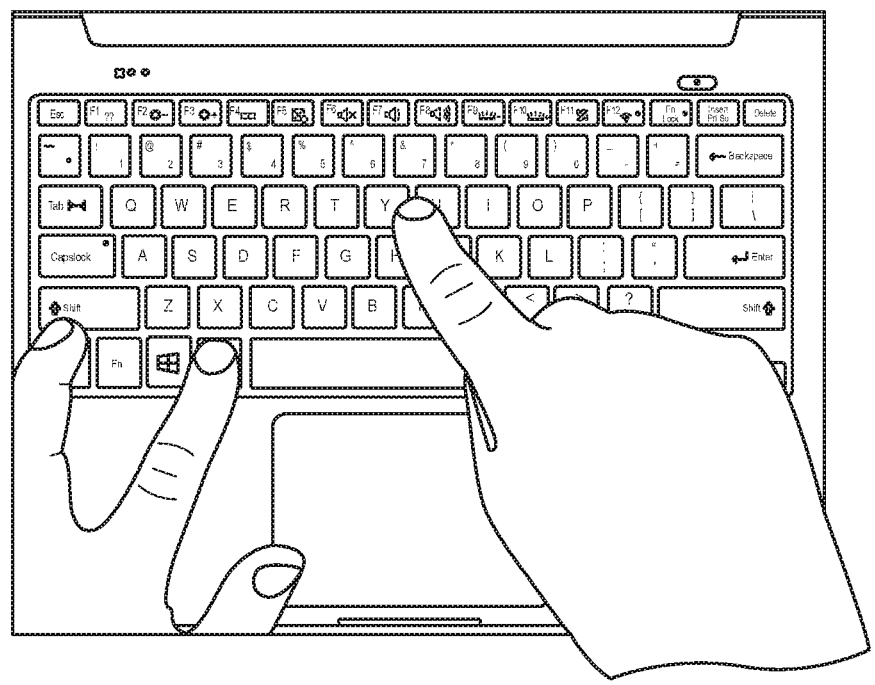
FIG. 16A shows two fingers of a user resting on the CTRL and ALT keys, and the index finger being used to touch the touch sensitive keyboard.
Figure 16B:
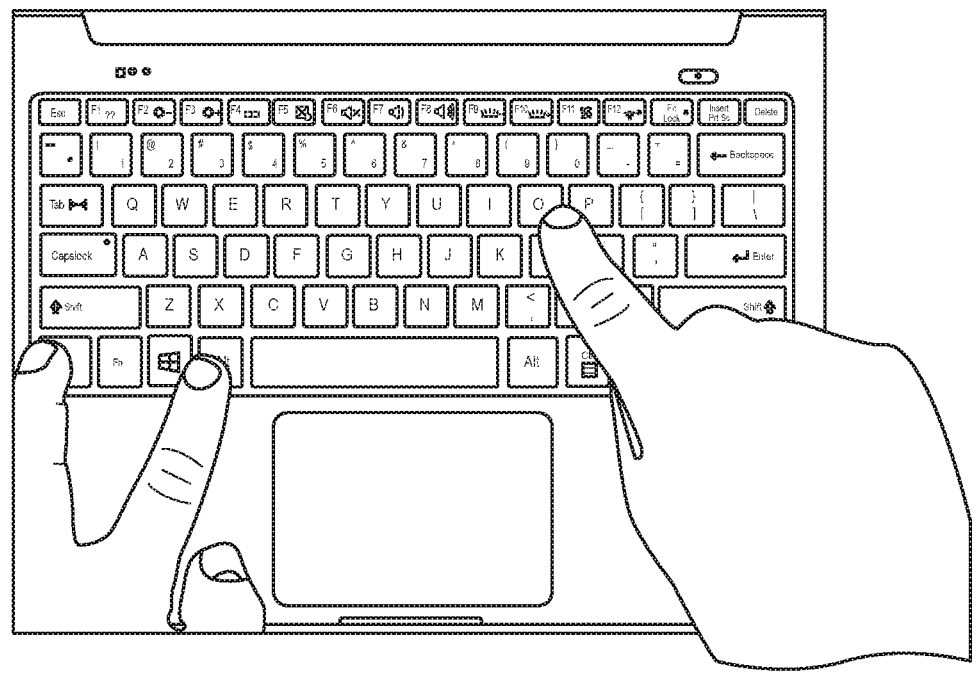
FIG. 16B shows movement of the index finger across the touch sensitive area.

FIG. 16A illustrates one embodiment in which two fingers of the user's left-hand rest on the CTRL and ALT keys. This finger positioning puts the system into a state in which touches on the touch sensitive keyboard made by the right hand (in FIG. 16A/B the index finger of the right hand)

generate touch input events. The movement of the index finger between FIGS. 16A and 16B correspond to a swiping right input action. When the fingers of the left hand are lifted from the CTRL and ALT keys, the system exits this state.

Figure 17A:
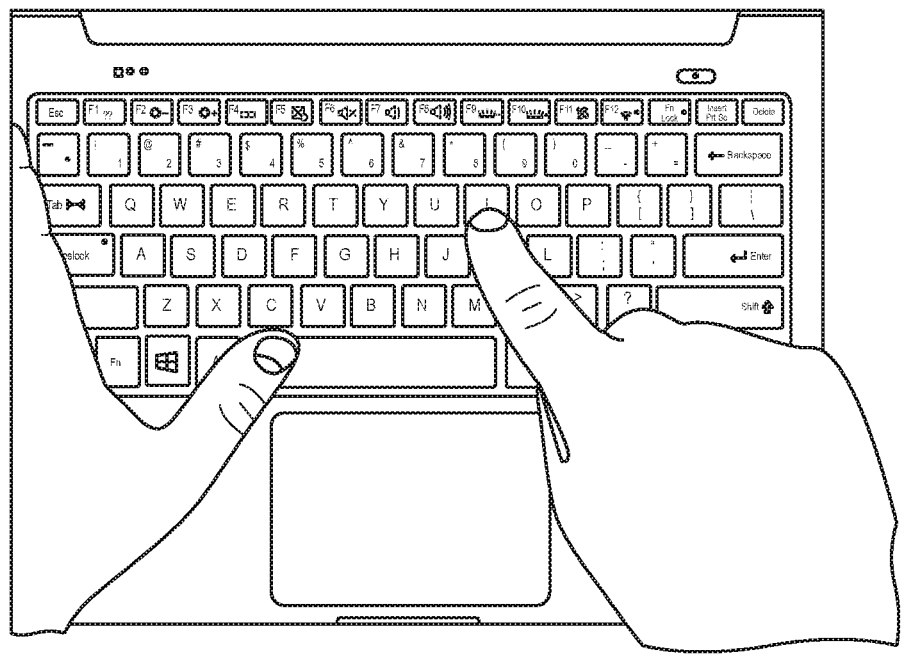
FIG. 17A shows two thumbs of a user resting on the SPACE key, and the index finger being used to touch the touch sensitive keyboard.
Figure 17B:
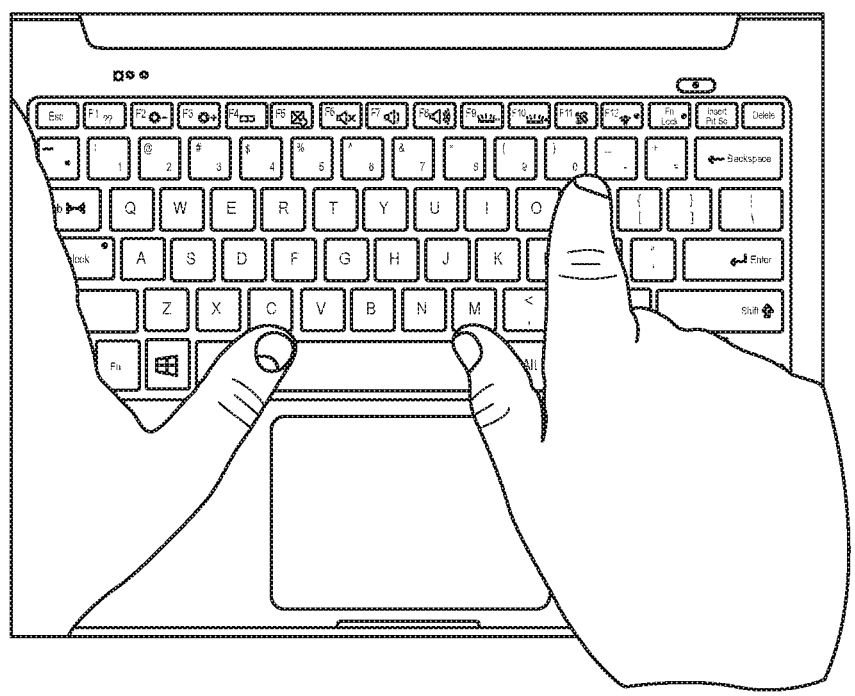
FIG. 17B shows movement of the index finger across the touch sensitive area.

FIGS. 17A and 17B show a related embodiment in which the touch state is entered by placing both thumbs on the spacebar. Again, the index finger on the right hand performs touch input.

Figure 18:
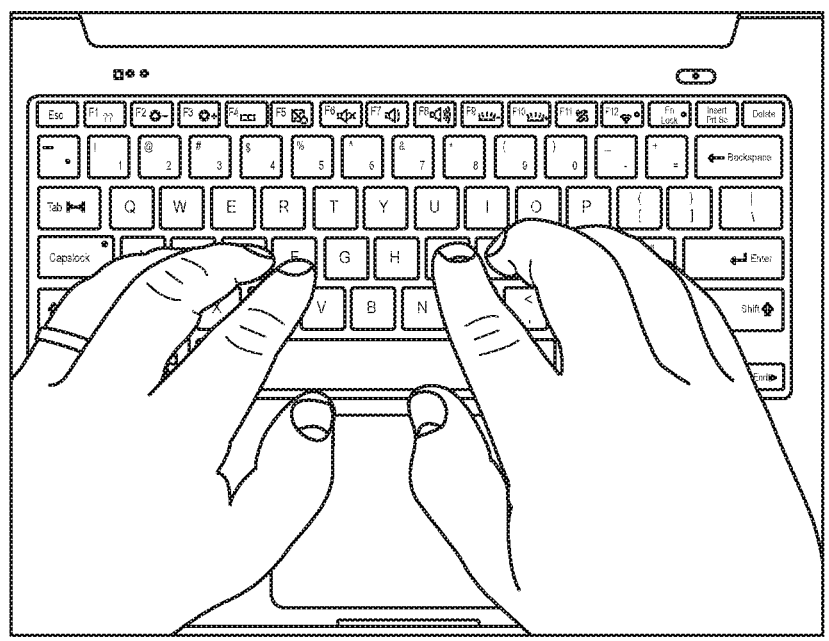
FIG. 18 shows the hands/fingers of a user resting on the home keys of the keyboard, triggering a state change.

In a related embodiment, the state entered by placing fingers in specific configurations on the touch sensitive keyboard is remained in even after those fingers are lifted. The system remains in this state until a second configuration of fingers is detected. FIG. 18 shows one such configuration, in which the fingers are placed on the home keys of the keyboard to exit the touch state and return to keyboard typing.

Keyboard Section as Analog or Multi Axis Digital Joystick.

In an embodiment, a single key or collection of keys act as a joystick. In an embodiment, joystick direction is calculated by interpolating the signal strengths among neighboring keys on the keyboard. In an embodiment, a single key on the keyboard is designated as a "center" key, and the direction of the isometric joystick is determined by interpolating the signal strengths of this "center" key and its immediate neighbor keys. In an embodiment, two (or more) keys or two (or more) collections of keys act as independent joysticks.

Figure 19A:
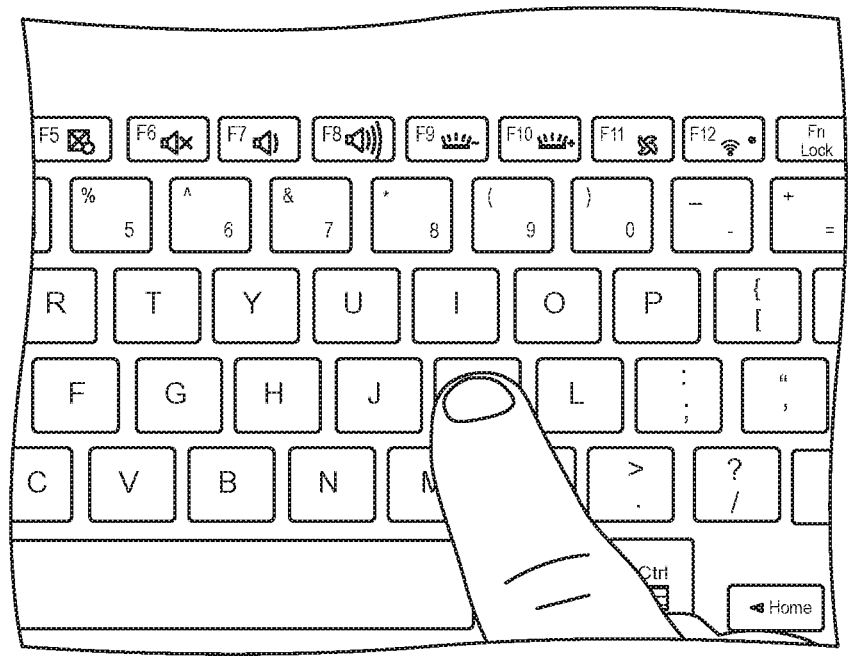
FIG. 19A shows a finger resting in the center of the K key.
Figure 19B:
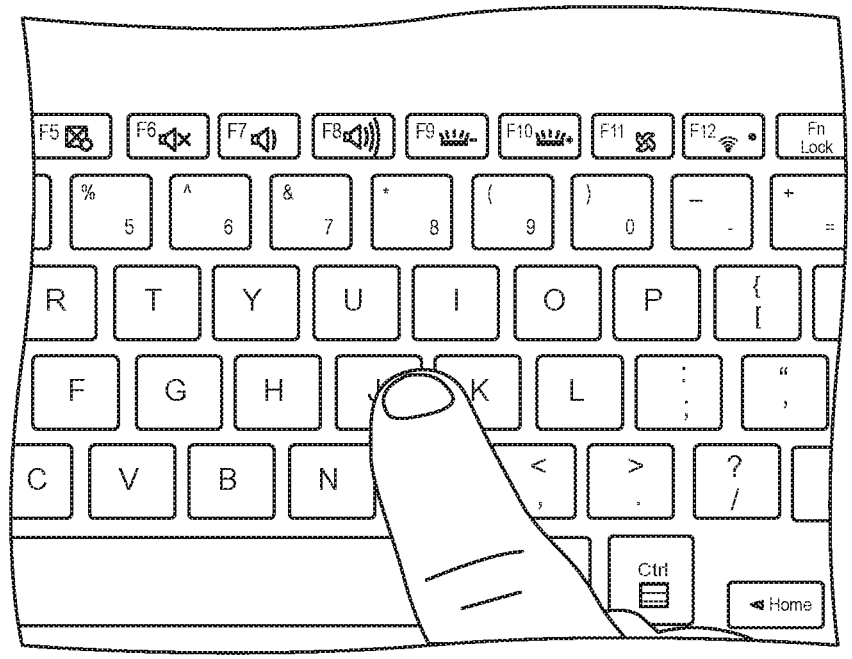
FIG. 19B shows the finger resting on the left side of the K key.
Figure 19C:
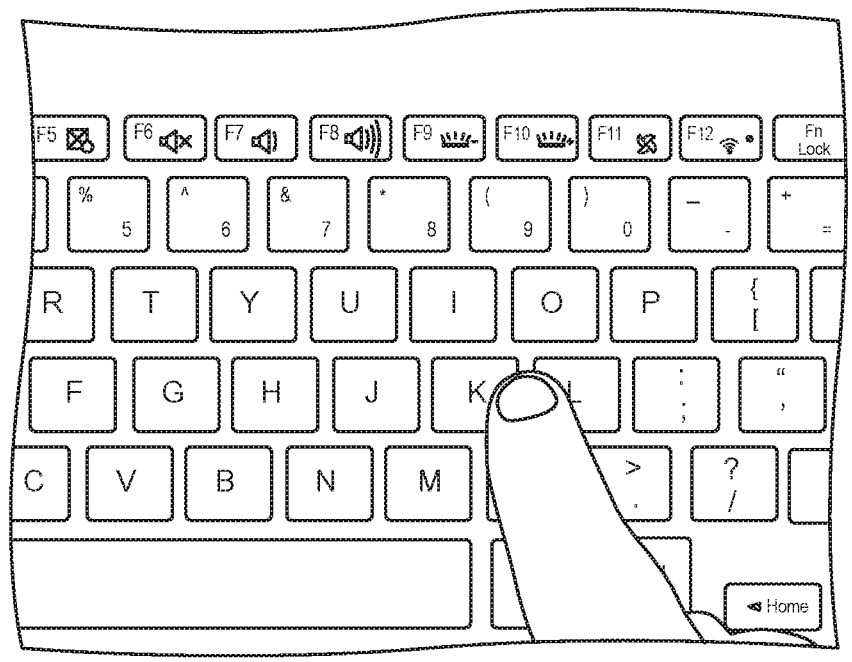
FIG. 19C shows the finger resting on the right side of the K key.
Figure 19D:
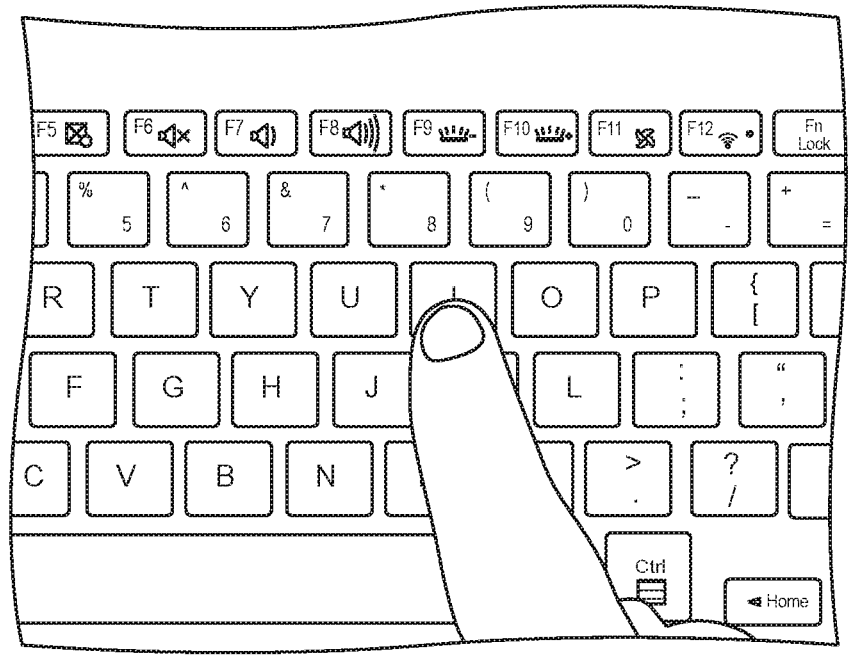
FIG. 19D shows the finger resting on the top edge of the K key.

FIGS. 19A-19D illustrate the generation of a control direction and the emulation of a joystick with the touch sensitive keyboard. In this embodiment, the K key is treated as the center key. When a finger is resting in the center of the K key (FIG. 19A), no direction is generated. By looking at the relative proximity strengths of the K key and its neighboring keys, the touch sensitive keyboard can generate a direction such as LEFT (FIG. 19B), RIGHT (FIG. 19C), or UP (FIG. 19D). In this manner, the user can control the direction of a cursor or other element by rocking their finger over the K key.

Keyboard Section as Fader Control.

A fader control is a slide switch that selects a range, often in a linear fashion. In an embodiment, the touch sensitive keyboard can emulate a fader. Where the touch sensitive keyboard emulates a fader, a section of the keyboard is designated to provide input equivalent to a fader control where digital sequence or analog value is provided to indicate the position of the virtual fader. In an embodiment, the virtual fader can return to center when released. In an embodiment, the virtual fader can remain in its last location when released. In an embodiment, release of the virtual fader is instigated by the absence of touch or hover signal. In an embodiment, a fader control may use the spacebar of the keyboard. The spacebar's long shape, it lends itself naturally to sliding one's finger left and right over it. In an embodiment, a number of sensors are located within the spacebar to detect such sliding motions, or hover motions. In an embodiment, the left/right location of a user's finger on the spacebar are calculated and passed onto applications.

Keyboard as 'Touchpad'.

In an embodiment, a touch sensitive keyboard is provided one or more modes where it behaves like a touch pad pointer device. In an embodiment, a touch sensitive keyboard provides input for at least some, and potentially all, of the gestures ordinarily associated with a touch pad. In an embodiment, when in a touchpad mode, a touch sensitive keyboard provides input for at least some of the following: tap, double tap, swipe, pinch zoom, scroll, open all windows, show the desktop, switch between windows, as well as for other gestures accepted as interactions by the host, such as those provided for in desktop interaction.

In an embodiment, the mode provided for may be entered by changing 'states,' i.e., moving to a different 'state,' as described above. In an embodiment, the mode may be entered by an application, instead of, or in addition to a user action. In an embodiment, the mode may be entered (or may additional be entered) through input from another device or sensor, such as the computer's camera noting a change in the user's eye position, posture, etc. In an embodiment, a mode may also be entered (or may additionally be entered) through a change in the user's hand posture noted by the touch sensitive keyboard. In an embodiment, the user's hand posture change can include removing one hand from the keyboard. In an embodiment, the user's hand posture change can include moving two fingers together in a 'pinch' posture. In touchpad mode, touch pressure might be delegated to hover distance to provide familiar interaction to the user.

In an embodiment, a touch sensitive keyboard is provided having: a plurality of touch sensitive keys; a signal processor adapted to measure a signal strength corresponding to a distance between the each of the plurality of touch sensitive keys and at least one finger in proximity thereto; and a processor configured to: output a keystroke in response to one of the plurality of touch sensitive keys being pressed, and periodically output one or more touch points determined by interpolating signal strength for each of the plurality of touch sensitive keys on the keyboard. In an embodiment, the processor outputs one or more touch points while the keyboard is in a touchpad mode. In an embodiment, the processor does not output keystrokes corresponding to keys being pressed while the keyboard is in a touchpad mode. In an embodiment, the processor outputs keystrokes corresponding to key being pressed while the keyboard is in a typing mode. In an embodiment, wherein the processor does not output one or more touch points while the keyboard is in the typing mode.

There exist many software libraries for traditional touchpads that one might want to use in conjunction with the keyboard described in this invention. These libraries assume a rectilinear input array with evenly spaced X,Y sensors in the touchpad. Such libraries are not immediately compatible with a keyboard that includes keys spaced in a non-rectilinear array. In an embodiment, the sensor values are rectified to create a rectilinear grid that is compatible with existing libraries of software. In an embodiment, linear interpolation is employed on scattered sensors to create the rectilinear array. In an embodiment, quadratic interpolation is employed on scattered sensors to create the rectilinear array. In an embodiment, bilinear interpolation is employed on scattered sensors to create the rectilinear array. In an embodiment, cubic interpolation is employed on scattered sensors to create the rectilinear array. It will be apparent to one of skill in the art, in view of this disclosure, that there are numerous methods of converting between a non-rectilinear array such as a the heatmap that can be produced by the disclosed touch sensitive keyboard and a rectilinear array such as what would be associated with a traditional touch pad.

Figure 20A:
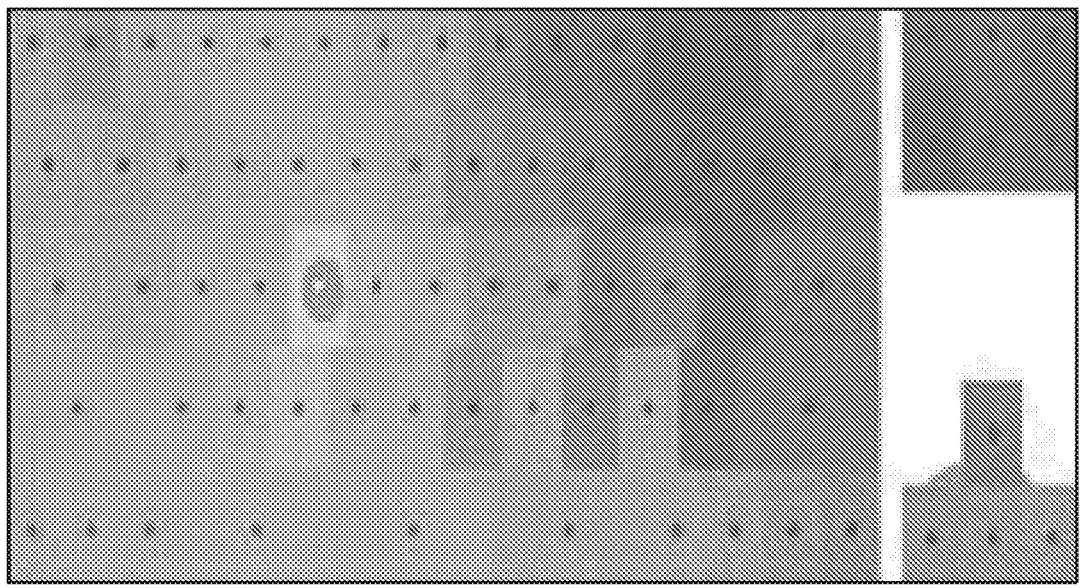
FIG. 20A shows a touch sensitive keyboard and depicts the signal strengths measured by each key on the keyboard.
Figure 20B:
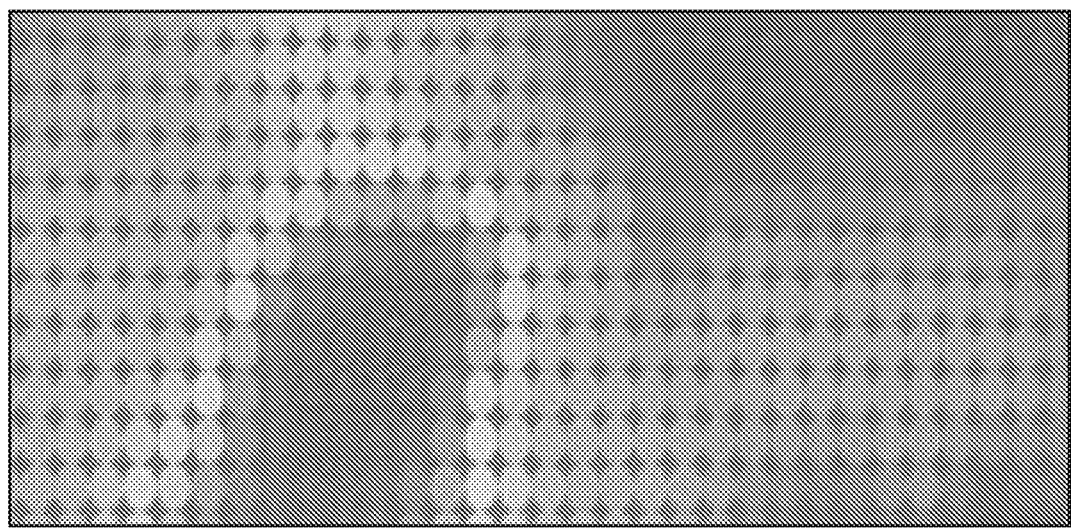
FIG. 20B shows a regularized heatmap generated from the irregularly spaced keys.

FIG. 20A shows the keys on a touch sensitive keyboard and their associated signal strengths. FIG. 20B shows a regularized heatmap that has been generated from the irregularly spaced keys on the keyboard.

In addition to cubic or bilinear interpolation, on embodiment uses radial basis functions for interpolation to generate a regularized heatmap from the irregularly spaced keys on the keyboard.

Radial basis functions may be superior to other types of interpolation. At a high-level, one can assume that all sampled points from any touch sensor contain some noise and are not "true" measurements of the value at that sensor. By performing a radial basis function, we are using the measurements from several physical keys to generate values in the interpolated heat-map.

If one thinks of our measurement at a key as M, it's the "true" measure of signal T plus some error E:

$$M=T+E$$

The touch sensor receives M, but T is more desirable.

Through using the radial basis functions, several keys (a neighborhood around a point in the regularized heatmap) are contributing to each value in the regularized heatmap. If the errors Es are normally distributed (or even anything other than uniformly biased), they partially or wholly cancel each other out leaving only T or at least a closer approximation of T than one gets from M alone.

Zero-Latency Typing Keyboard.

Input from a keyboard and a mouse are considered among the fastest available in nowadays computing systems, and have favor in recent years of several mechanical innovations thanks to the gaming industry. However, even considering their preference as input devices for existing computing, mechanical only keyboards still exhibit latency inherent of the communication channels and how they are handled by the operating system. In an embodiment, a new channel of information is enabled to tackle latency issues related with keyboards. In particular, in an embodiment, sensing ability of a touch sensitive keyboard enables the application of latency reduction techniques to keyboards as described in co-pending U.S. patent application Ser. No. 14/490,363. The touch sensitive device disclosed herein allows techniques heretofore relegated to touch-screens to use physical button based device, using the heatmap hover sensing information to analyze the motion in a close range of the physical keyboard to understand the finger trajectory and predict more accurately when the finger will land on the key and trigger its action. The hover capability enables the application of prediction methods decreasing the response time due to hardware or software communication, and providing a more immediate visual response on the computing system display adopted technology.

Application Visualization of Keyboard Interaction.

The hover keyboard provides high resolution data about touch and touch proximity. In an embodiment, applications may use this data to display detailed information about touch and touch proximity for verification, development, or entertainment. In an embodiment, touch and touch proximity data may displayed overlaid on application canvas to provide visual cues to user about application interaction. In an embodiment, touch and touch proximity data may be in the form of a heat map, histogram, a representation of hands and fingers, tools, characters, avatars and other application appropriate visualizations.

In-Air+Contact Finger Keyboard Gestures.

Figure 14:
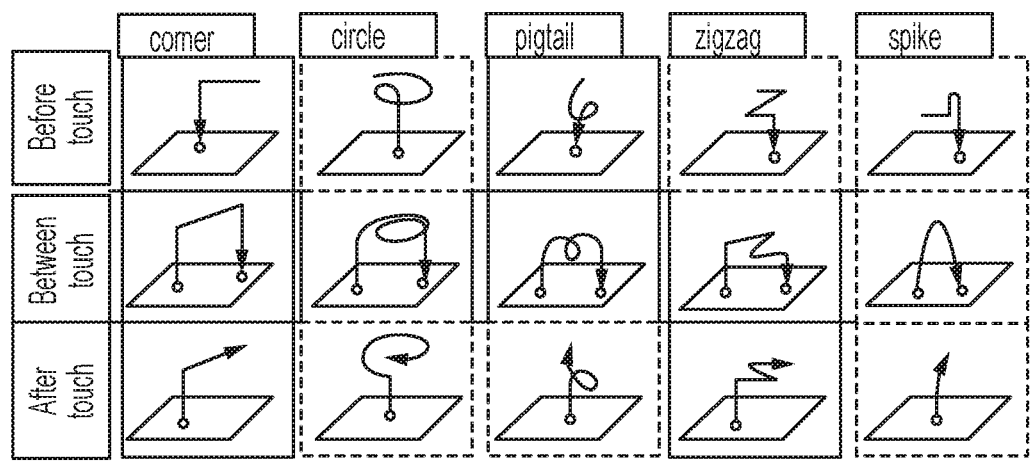
FIG. 14 provides a sample list of in-air gestures that may be used in connection with a touch sensitive device disclosed herein.

In an embodiment, a Touch sensitive device enables hybrid gestures that span physical contact with a keycap and in-air events. Here, the moment of sensed physical contact with parts of the Touch sensitive device surface are used to designate keycap targets of in-air gestures and to segment the "starting" and "stopping" of in-air gestures above or across multiple keycaps (almost like punctuation marks in written language). And in-air gestural sensing is used to add expressivity and modality to sensed input events. In an embodiment for single-finger input over a given Touch sensitive device keycap, the following exemplary In-Air+ Contact hybrid gestural vocabulary is possible: FIG. 14 provides a sample list of in-air gestures (i.e., a sample gestural vocabulary) that may be used in connection with a touch sensitive device disclosed herein. In an embodiment, one or more hybrid gestures can be used to perform predetermined or programmable functions. The following examples are intended to be illustrative of ways in which such hybrid gestures can be used, but these are not intended to limit the more general nature of this disclosure, which is only limited by the appended claims.

In-Air "Corner" gesture between keycap contacts. In an embodiment, these hybrid Touch sensitive device input gestures could be used to link two or more discrete keycap input activations into a single, keycap activation, including but not limited to maintaining Function-/Crtl-/Shift-Lock on a keyboard across multiple keycap activations or to creating sequential keyboard macro commands where multi-keycap simultaneous or sequential inputs are combined and linked into a single keycap activation.

In-Air "Corner" or "Linear Swipe" gesture after contact. In an embodiment, these hybrid Touch sensitive device input gestures could be used to change the activation function of a given keycap of the Touch sensitive device by contacting that key with a finger (but not activating—i.e. just resting on the keycap), then lifting off of the keycap, and then performing a linear swiping gesture to cycle through a sequential list of keycap functions that could later be associated with activating that physical key.

In-Air "Circle" gesture before contact. In an embodiment, these hybrid Touch sensitive device input gestures could be used to change a keycap function quickly between two states by circling clockwise or counterclockwise in-air prior to touching the key. In an embodiment, circling clockwise in-air over a "j" keycap prior to activation sets the "j" character input to lowercase while circling in-air counterclockwise over the "j" keycap prior to activation sets the "j" character input to uppercase. In an embodiment, a two-state function keycap could show a volume-mute command icon on the left of the keycap and a F4 function icon on the right of the keycap. A counterclockwise in-air gesture towards the volume-mute command would register that command on keycap activation, whereas a clockwise in-air gesture towards the F4 function icon would register that command on keycap activation.

In-Air "Circle" gesture between contacts. In an embodiment, these hybrid Touch sensitive device input gestures could be used to link two or more discrete keycap input activations into a single, keycap activation, including but not limited to maintaining Function-/Crtl-/Shift-Lock on a keyboard across multiple keycap activations or to creating sequential keyboard macro commands where multi-keycap simultaneous or sequential inputs are combined and linked into a single keycap activation.

In-Air "Circle" gesture after contact. In an embodiment, these hybrid Touch sensitive device input gestures could be used to change the volume or brightness of a computer system controlled by the Touch sensitive device by contacting (but not activating—i.e. just resting on the keycap) a keycap dedicated to volume function, then lifting off of the keycap, and then performing a circular motion where clockwise or counterclockwise rotation is linearly mapped to increasing or decreasing volume level.

In-Air "Pigtail" gesture between contacts. In an embodiment, these hybrid Touch sensitive device input gestures could be used to link two or more discrete keycap input activations into a single, keycap activation, including but not limited to maintaining Function-/Crtl-/Shift-Lock on a keyboard across multiple keycap activations or to creating sequential keyboard macro commands where multi-keycap simultaneous or sequential inputs are combined and linked into a single keycap activation.

In-Air "Pigtail" gesture after contact. In an embodiment, these hybrid Touch sensitive device input gestures could be used to change the volume or brightness of a computer system controlled by the Touch sensitive device by contacting (but not activating—i.e. just resting on the keycap) a keycap dedicated to volume function, then lifting off of the keycap, and then performing a circular motion where clockwise or counterclockwise rotation is linearly mapped to increasing or decreasing volume level.

In-Air "ZigZag" gesture between contacts. In an embodiment, these hybrid Touch sensitive device input gestures could be used to link two or more discrete keycap input activations into a single, keycap activation, including but not limited to maintaining Function-/Crtl-/Shift-Lock on a keyboard across multiple keycap activations or to creating sequential keyboard macro commands where multi-keycap simultaneous or sequential inputs are combined and linked into a single keycap activation.

In-Air "ZigZag" gesture after contact. In an embodiment, these hybrid Touch sensitive device input gestures could be used to delete or undo a sequential set of keycap activations that were just performed prior to sensing an in-air zigzag gesture.

In-Air "Spike" gesture before contact. In an embodiment, these hybrid Touch sensitive device input gestures could be used as a proxy for the force of a keycap activation or as a means to quickly toggle between two possible input commands for a given keycap by gauging if the in-air z-height of a finger's trajectory prior to a keycap activation was above a certain threshold height or slope.

In-Air "Spike" gesture between contacts. In an embodiment, these hybrid Touch sensitive device input gestures could be used to link two or more discrete keycap input activations linked by in-air gestures of a certain slope or height-threshold into a single, keycap activation, including but not limited to maintaining Function-/Crtl-/Shift-Lock on a keyboard across multiple keycap activations or to creating sequential keyboard macro commands where multi-keycap simultaneous or sequential inputs are combined and linked into a single keycap activation.

In-Air "Spike" gesture after contact. In an embodiment, these hybrid Touch sensitive device input gestures could be used to remove a possible potential input command among a set of input commands mapped to a given physical keycap by first making contact with a keycap command presently assigned to a physical keycap activation and then performing an in-air spike gesture to "throw it or pull it away" from the keyboard surface.

In-Air Gestural Commands, on and Close Range Micro Key Gestures (Direction, Location, Distance to Key).

In an embodiment of the Touch sensitive device, software complementary information can be provided to each key of the keyboard as an attachment to its keyboard ASCII code. This can be used for close range actions modifying the meaning of the key. For example, existing GUI widgets such as Checkboxes, Combo List, Radio Buttons and Sliders could be map directly on the key using its hover sensing capabilities to control the UI elements represented and identified by the key. For example a set of keys can map a set of sliders to specify a set of range values based on the hover distance to a given key. On key gestures can also be used to confirm the selection of UI element allowing the keyboard to be used as the same type for GUI interaction and typing when the user is pressing a key.

In an embodiment, the lexicon of on-key gestures can be extended providing basic on key gestures such as directional flicking gestures on a key which can be used by a given application as a shortcut or a modifier using the sensing information coupled to the pressed key. These micro directorial gestures will provide additional input events to the application based on the finger motion close to the edge of a given key. For example in a text editor application, this can be used to change properties of the font of text being typed increasing, decreasing the font size or bolding a word depending on the usage of these micro-on key gestures.

In an embodiment, the Touch sensitive device is used to complement key pressed information with the location where the finger hits on the key, i.e. its center or close to a given edge (left, right, top, bottom) of the key or cardinal direction. Such within-key location information can be used to activate shortcut or modifiers to a given action related with the key being pressed. For example by pressing the top part of a key the letter would be capitalized replacing the need of caps or shift keys.

Using the Keyboard as Measurement System.

In an embodiment of the Touch sensitive device, the heatmap information and motion over the keyboard is used as a measurement systems by placing objects on top of the keyboards to introduce dimensions or by interacting with keys allowing to define time based on how long it takes to approach a given key, or force by looking at the motion when approaching a key. These modes can be activated using other areas or keys of the keyboard. Measures and shapes can be defined using the heatmap footprint provided by the sensor. Time can be specified detecting when a finger is in range of a given key until the finger really hits the key. Force can be estimated looking of the motion from the time a finger is in range of a key until the finger hits the key.

Musical Actions.

'Actions' are chosen to distinguish from 'gestures' which has a specific meaning in music notation, study and practice. Where 'gesture' is used, this refers to gesture definition and recognition by the keyboard or the processing of its input data. The following embodiments demonstrate the usage of the Touch sensitive device tailored to support musical actions. Interaction with each instrument can be simulated by analysis of hover and touch data, and matching with expected gestures for operating the instrument. In this manner any instrument interaction can be simulated and associated software play the tone, voice, amplitude and sound of the real instrument, in a manner that goes beyond traditional piano style keyboards which are currently used on synthesizers and sequencers. Percussive actions include striking, brushing, tapping and other actions. These actions can be identified as gestures to drive virtual percussive instruments where the keyboard becomes a virtual drum kit, and can play the sound and character of various percussive instruments. Input from the keyboard drives a display with an overlay of touch data in the form of drum sticks, brushes and other percussive devices. Interaction with a string instrument such as a guitar or violin has a range of actions which are identified by software into specific gestures and can change the state and output of the virtual string instrument. The instruments and the actions on the instrument can be visualized in the form of hands, picks and bows.

Musical devices such as sequencers, synthesizers, drum machines, distortion devices, can be controlled by input from the hover keyboard. New gestures and musical signal processing is possible by categorizing gestures from the input stream and applying to the musical output. For example distortion could be controlled by the shape of the observed hand, and its movement. Another example is that some gestures could control equalizer or channel adjustments.

In an embodiment, an instrument is an entire orchestra to be controlled by hands simulating the actions of a conductor, where fingers and hands are proxies for the conductor's body, arms, hands, baton. Variations in in direction, speed and rhythm can be used to direct many virtual instruments. Specific actions like closing or opening the hand, or holding the palm up or down can be used to indicate sections of the orchestra go quiet, slow down, attack, or speed up. Rhythmic actions with a finger can indicate for the tempo to speed up, or to slow down.

Biometrics.

Prior attempts have been made to distinguish between different users of a keyboard by looking at certain features related with interacting with traditional mechanical keycaps. Such features include the length of individual key presses, the time between subsequent key presses, the time of a sequence of key presses, and the pressure with which keys are typed. These techniques attempt to distinguish "how you type" from "how others type".

In an embodiment, the touch sensitive device may permit detection of the path your fingers traverse when traveling toward a key, the size and shape of your hands and fingers, the pose of your hands during typing operations, how you rest your fingers and hands on the keys (while not pressing them), the conductivity of your hands and fingers, and the location on a key where contact is made. In an embodiment, these additional features are employed in distinguishing different users or changing modes (e.g., typing versus trackpad). In an embodiment, these additional features inform a classification method or algorithm. In an embodiment, typists are distinguished using at least one of: the path the fingers traverse when traveling toward a key, the size and shape of the hands and fingers, the pose of the hands during typing operations, how the fingers and hands are rested on the keys (while not pressing them), the conductivity of the hands and fingers, and the location on a key where contact is made.

In an embodiment, the Touch sensitive device sensor is able to distinguish the shape and size of finger and hand in a close range of the keyboard which can be used to discriminate which user is interacting with the keyboard. In an embodiment, detected size and/or shape of the hand or finger can be used as a mechanism to lock (and/or unlock) access to given content or a device. In an embodiment, detected size and/or shape of the hand or finger complements traditional explicit access policies specified per file or per user account provided existing operating systems.

Hand Modeling.

Understanding the exact positioning and posture of the user's hands in respect to the keyboard has valuable applications in VR, AR, and biometrics. As such, in an embodiment, a correspondence is built between heatmaps measured by the Touch sensitive device and hand postures measured by an additional sensor. Such additional sensors may include, but are not limited to, motion capture systems, time-of-flight 3D sensors (e.g. Kinect, Leap-Motion Controllers), and cameras. The heatmap data sensed above the Touch sensitive device can be first interpreted as a depth map and specific features from such a transformed map can be used to compute a hand skeleton model of the user hand when in range of the keyboard. The hand skeleton includes the hand position as well as all the joints corresponding to fingers. The application of such hand skeleton could enable a reliable gesture recognition which would enable the gestures described above. It will also enable to propose a virtual representation of the hand for virtual environments increasing the user presence as well as the virtual content physical realism combining such hand skeleton information with collision detection and game physic engines.

Virtual Reality Mirroring.

In an embodiment, a Touch sensitive device is used to track the hands of the user when the user is interacting with the keyboard in a VR environment. Both the keyboard and the hand can be used as a reference system. Doing so enables presentation of a virtual representation of the keyboard due to the hand sensing capability of the Touch sensitive device. In an embodiment, when hands are sensed by the keyboard, a virtual representation of keyboard can be presented to the user, enabling the user to interact with the keyboard without leaving the VR environment. In an embodiment, when hands are not in the range of the physical keyboard (e.g., when typing is done), the virtual representation of the keyboard can disappear letting the user immerse in the VR environment. In an embodiment, the virtual keyboard representation can match the physical representation of the keyboard. In an embodiment, the virtual keyboard representation is a floating overlay showing the key layout. In an embodiment, the virtual hand mirroring is represented realistically over the keyboard. In an embodiment, the virtual hand mirroring is represented symbolically on top of the virtual keyboard layout.

According to the disclosure herein, low-latency mirroring of the precise physical finger, hand, and forearm position of a user or users of the Touch sensitive device in VR to allow the user or users to see their physical finger, hand, and forearm pose as they type in a digital environment. In addition it enables mirroring of the accurate size and anatomical structure of a given user or users' fingers, hands, and forearms to increase immersion.

AR Hand Mirroring.

In an embodiment, a Touch sensitive device provides application programming interfaces for AR and VR applications to detect and display a 2D or 3D hand model(s) of a user's finger(s) or hand(s) pose/model on or above a Touch sensitive device. In an embodiment, this 2D or 3D finger(s) or hand(s) pose/model is an anatomically accurate reconstruction of the sensed fingers and hands on or above a Touch sensitive device's surface. In an embodiment, this 2D or 3D finger(s) or hand(s) pose/model is displayed to the user or users as anatomically accurate reconstruction of the sensed fingers and hands on or above a Touch sensitive device's surface. In an embodiment, this 2D or 3D finger(s) or hand(s) pose/model is displayed to the user or users as a fanciful or enhanced rendering of the sensed fingers and hands on or above a Touch sensitive device's surface—such as but not limited to mapping the anatomy and sensed movements of a user's 2D or 3D finger and hand pose model to an artificial 3D model such as but not limited to the 3D robotic claw of a fictional character in a video game. In an embodiment, in AR or VR when this 2D or 3D hand(s) pose/model is sensed moving above a given parallel plane located at a fixed z-height perpendicular to a Touch sensitive device's physical surface, a Touch sensitive device is made invisible to the user(s). In an embodiment, in AR or VR when this 2D or 3D hand(s) pose/model is sensed moving beneath a given parallel plane located at a fixed z-height perpendicular to a Touch sensitive device's physical surface, a Touch sensitive device is made visible to the user(s). In an embodiment, in AR or VR the perpendicular z-height of this sensed 2D or 3D hand(s) pose/model is linked to the rendered transparency of a Touch sensitive device's physical surface, such that a Touch sensitive device fades "in" and "out" of visibility as a user or users' hands draw closer to or further away from its physical surface or vice-versa. In an embodiment, during collaborative interaction, the sensed 2D or 3D finger(s) and/or hand(s) pose model of one Touch sensitive device user is rendered on a 2D, AR, or VR display mapped to a 3D or physical model of another user's Touch sensitive device. Such embodiment provides both users with superior context as to the intent of a finger/hand pose communication between them, and in an embodiment can be particularly useful as a tool for one user to teach another how to use some of the commands on a Touch sensitive device.

Virtual Reality Physical-Object-Mapped UI.

In an embodiment, in VR environments, a Touch sensitive device has a set of application programming interfaces that enable the application developer and/or computer system to generate 2D and 3D VR holograms precisely mapped onto a given physical or virtual keycap, control, slider or button. These indicate the currently mapped set of input commands that can occur upon physical keycap activation, while it provides visual affordances to learn keyboard shortcuts. In an embodiment, it can specify available keycap commands relevant to the active application on a computer system connected to the Touch sensitive device. In an embodiment, while blank physical keycaps are observed from a virtual environment using any VR technology (including but not limited to head mount displays, paint Visible 2D and 3D VR holographic), interactive icons may be displayed to the user that are mapped to and float above specific physical keyboard locations. In an embodiment, multi-Stage physical/digital buttons are presented where a given physical button is extended into a multi-layered digital button that exists as a set of sequential holographic UI layers that butterfly open at progressively higher z-heights above the keyboard's physical surface. In an embodiment, 2D and 3D visual feedback tied to the surface and/or set at a specific z-height above the surface of a given physical keycap that responds to keycap proximity, resting, and activation states, this can be used for example to animate visual feedback like an explosion, etc. bringing more visuals to the VR environment.

AR Holographic UI.

In an embodiment, VR physical-object mapped user interface is also applicable in an augmented reality environment where both virtual content and the physical Touch sensitive device overlaps seamlessly in a photo-realistic or a non photorealistic way. In an embodiment, in AR environments, a Touch sensitive device has a set of application programming interfaces that enable application developer and computer-controlled 2D and 3D AR holograms to be precisely overlaying a given physical keycap, control, or button.

These indicate the currently mapped set of input commands that can occur upon physical keycap activation, while it provides visual affordances to learn keyboard shortcuts overlaying such digital information above the physical keyboard thanks to an augmented reality display or projection system. In an embodiment, it can specify available keycap commands relevant to the active application on a computer system connected to the Touch sensitive device. When observed from AR, the blank physical keycap are replaced visually by painted 2D and 3D holographic, interactive icons changing the user perception of the physical keyboard. In an embodiment, multi-Stage physical/digital buttons are presented where a given physical button is extended into a multi-layered digital button that exists as a set of sequential holographic UI layers that butterfly open at progressively higher z-heights above the keyboard's physical surface. In an embodiment, 2D and 3D visual feedback tied to the surface and/or set at a specific z-height above the surface of a given physical keycap that responds to keycap proximity, resting, and activation states, this can be used for example to animate visual feedback like an explosion, etc. bringing more visuals to the AR environments as well as create realistic visual effect which will change the perception of the physical environment.

KeyCap—and Finger-Specific Haptics.

In an embodiment, a Touch sensitive device is provided that can sense a 3D finger(s) and/or hand(s) model of a user's physical finger and/or hand pose. In an embodiment, such a touch sensitive device may be used to direct keycap- and finger-specific haptics to a user's fingers and/or hands in response to user input.

Virtual Controls.

In an embodiment, a Touch sensitive device is provided where some or all of its input controls are simulated through localized haptic feedback through means including, but not limited to, vibrotactile, electrostatic, physical affordances, or electro-shock techniques.

Dynamic, Reshapable Physical Controls.

In an embodiment, a Touch sensitive device is provided where some or all of its physical input controls are formed or reshaped through controlled physical deformation techniques including, but not limited to, electrically-active polymers and micro-electro-mechanical robotics.

The present systems are described above with reference to devices for keyboards sensitive to hover, contact and pressure in frequency division modulated touch systems. It is understood that each operational illustration may be implemented by means of analog or digital hardware and computer program instructions. Computer program instructions may be provided to a processor of a general-purpose computer, special purpose computer, ASIC, or other programmable data processing apparatus, such that the instructions, which execute via a processor of a computer or other programmable data processing apparatus, implements the functions/acts specified. Except as expressly limited by the discussion above, in some alternate implementations, the functions/acts may occur out of the order noted in the operational illustrations.

As used herein, including within the claims, ordinal words such as first and second when used to identify unnumbered objects are merely used to distinguish between those objects, and not intended to create an order of the objects or otherwise limit the objects they are used to identify. Similarly, where applicable, elements and/or steps described above and/or in the following claims in a particular order may be practiced in a different order without departing from the invention.

The above embodiments and preferences are illustrative of the present invention. It is neither necessary, nor intended for this patent to outline or define every possible combination or embodiment. This disclosure is intended to disclose sufficient information to permit one skilled in the art to practice at least one embodiment of the invention. The above description and drawings are merely illustrative of the present invention and that changes in components, structure and procedure are possible, indeed intended, without departing from the scope of the present invention as defined in the following claims. Thus, while the inventions haves been particularly shown and described with reference to embodiments thereof, it will be understood by those skilled in the art that various changes in form and details may be made therein without departing from the spirit and scope of the invention.

The invention claimed is:

1. Touch sensitive keyboard comprising:
   a. a plurality of keys comprising transmit antennas and receive antennas, wherein the plurality of keys are each adapted to output a touch signal in response to capacitively determining proximity of a finger using at least some of the transmit antennas and receive antennas;
   b. touchpad area separate from the plurality of keys, the touchpad area being sensitive to a touch; and
   c. processor operatively connected to the plurality of keys such that it can receive touch signals output thereby, and configured to disable the touchpad area sensitivity to touch when at least one proximity signal is received.

2. The device of claim 1, wherein the processor is configured to disable the touchpad area sensitivity to touch when a preconfigured group of proximity signals is received.

3. The device of claim 1, wherein the processor is configured to not disable the touchpad area sensitivity to touch in response to proximity signals from a set of preconfigured keys.

4. The device of claim 1, wherein the plurality of the keys does not include a pre-selected group of keys.

5. The device of claim 4, wherein the pre-selected group of keys includes at least one selected from the group comprising: control, shift, and alt.

6. Method of using a touch sensitive keyboard as control, a plurality of keys comprising transmit antennas and receive antennas on the touch sensitive keyboard, each of the plurality of keys adapted to output a signal strength corresponding to a capacitively determined distance, using at least some of the transmit antennas and receive antennas, between the key and a finger operating as a control, the method comprising the steps of:
   a. placing the touch sensitive keyboard into a control state based upon a predefined positioning of at least a portion of at least one finger with respect to the touch sensitive keyboard;
   b. while in the control state, repeatedly determining a control direction by interpolating signal strength among a group of neighboring keys on the keyboard; and
   c. outputting the control direction to a host for use in control.

7. The method of claim 6, further comprising the steps of:
   a. determining a control magnitude by interpolating signal strength among a group of neighboring keys on the keyboard; and
   b. outputting the control magnitude to the host for use in control.

8. The method of claim 6, wherein the predefined positioning is one selected from the group of: two fingers of one hand resting on a ctrl key and alt key; and
   both thumbs resting on a space bar.

9. The method of claim 6, wherein the group of neighboring keys comprises a center key and each adjacent key.

10. The method of claim 6, wherein the group of neighboring keys comprises each key adjacent to a center key.

11. The method of claim 6, wherein the group of neighboring keys comprises each key within a certain distance of a center key.

12. The method of claim 6, wherein the group of neighboring keys comprises a group of adjacent keys on one row of the touch sensitive keyboard.

13. The method of claim 6, wherein the group of neighboring keys comprises a group of adjacent keys on at least two adjacent rows of the touch sensitive keyboard.

14. The method of claim 7, wherein the control direction and control magnitude are used to emulate a joystick.

15. The method of claim 7, wherein the control direction and control magnitude are used to emulate a computer mouse.

16. The method of claim 6, further comprising the step of:
   a. establishing a baseline position of a finger operating as a control; and
   b. wherein the step of determining a control direction establishes a delta from the baseline position.

17. The method of claim 6, where the control direction is selected from the group consisting of: up, down, left and right.

18. The method of claim 6, wherein the touch sensitive keyboard remains in the control state for a period of time.

19. The method of claim 6, wherein the touch sensitive keyboard remains in the control state until an occurrence of a second predefined positioning of at least a portion of at least one finger with respect to the touch sensitive keyboard.

20. The method of claim 19, wherein the second predefined positioning is a home row position.

21. Touch sensitive keyboard comprising:
   a. a plurality of touch sensitive keys comprising transmit antennas and receive antennas;
   b. signal processor adapted to process measure a signal strength corresponding to a capacitively determined distance, using at least some of the transmit antennas and receive antennas, between the each of the plurality of touch sensitive keys and at least one finger in proximity thereto;
   c. processor adapted:
      i. to output a keystroke in response to one of the plurality of touch sensitive keys being pressed, and
      ii. to output one or more touch points determined by interpolating signal strength for each of the plurality of touch sensitive keys on the keyboard.

* * * * *